United States Patent
Busacca et al.

(10) Patent No.: US 11,631,921 B2
(45) Date of Patent: Apr. 18, 2023

(54) SPACERS FOR PROVIDING PROTECTION OF ELECTROCHEMICAL BATTERY ENCLOSURES AND SYSTEMS AND METHODS THEREFOR

(71) Applicant: Enovix Operations Inc., Fremont, CA (US)

(72) Inventors: Robert S. Busacca, Oakland, CA (US); Aditya Mandalam, San Jose, CA (US); Jeffrey G. Buck, Salinas, CA (US); Anthony Calcaterra, Milpitas, CA (US); Kim Han Lee, Pleasanton, CA (US); Prajanya Sunil Kendrekar, San Jose, CA (US)

(73) Assignee: Enovix Operations Inc., Fremont, CA (US)

( * ) Notice: Subject to any disclaimer, the term of this patent is extended or adjusted under 35 U.S.C. 154(b) by 0 days.

(21) Appl. No.: 17/838,733

(22) Filed: Jun. 13, 2022

(65) Prior Publication Data
US 2022/0399612 A1     Dec. 15, 2022

Related U.S. Application Data

(60) Provisional application No. 63/210,773, filed on Jun. 15, 2021.

(51) Int. Cl.
*H01M 50/403* (2021.01)
*H01M 50/569* (2021.01)
*H01M 50/449* (2021.01)

(52) U.S. Cl.
CPC ....... *H01M 50/403* (2021.01); *H01M 50/449* (2021.01); *H01M 50/569* (2021.01)

(58) Field of Classification Search
None
See application file for complete search history.

(56) References Cited

U.S. PATENT DOCUMENTS

| | | | |
|---|---|---|---|
| 4,396,689 A | | 8/1983 | Grimes et al. |
| 6,096,456 A | * | 8/2000 | Takeuchi ............. H01M 50/42 |
| | | | 429/252 |

(Continued)

FOREIGN PATENT DOCUMENTS

| | | |
|---|---|---|
| EP | 1270765 B1 | 1/2007 |
| EP | 2858162 A1 | 4/2015 |

(Continued)

OTHER PUBLICATIONS

International Search Report and Written Opinion issued for PCT/US2022/022087 dated Jul. 26, 2022 (15 pages).

(Continued)

*Primary Examiner* — Alix E Eggerding
(74) *Attorney, Agent, or Firm* — Armstrong Teasdale LLP

(57) ABSTRACT

A secondary battery includes an electrode assembly disposed within a constraint. The electrode assembly comprises a population of unit cells comprising an electrode current collector layer, an electrode layer, a separator layer, a counter-electrode layer, and a counter-electrode current collector layer in stacked succession. A subset of the unit cell population includes extended spacer members between the electrode current collector layer and the counter-electrode current collector layer. One of the spacer members is spaced in a transverse direction from the other extended spacer member, at least a portion of the counter-electrode active material of the counter-electrode layer being located between the spacer members such that the portion of the counter-electrode active material and the spacer members lie in a common plane defined by x and z axes, wherein each of the extended spacer members extend a distance SD in the x-axis direction beyond an x-axis edge of the constraint.

30 Claims, 11 Drawing Sheets

(56) References Cited

U.S. PATENT DOCUMENTS

| | | |
|---|---|---|
| 6,383,234 B1 | 5/2002 | Noh |
| 7,722,984 B2 | 5/2010 | Kim et al. |
| 8,865,345 B1 | 10/2014 | Ramasubramanian et al. |
| 9,660,230 B2 | 5/2017 | Noh |
| 9,660,292 B2 | 5/2017 | Rust, III et al. |
| 10,158,108 B2 | 12/2018 | Narita et al. |
| 11,264,680 B2 | 3/2022 | Busacca et al. |
| 2011/0159328 A1 | 6/2011 | Yeo |
| 2015/0162589 A1* | 6/2015 | Kesper .................. H01M 50/30 |
| | | 429/139 |
| 2016/0111701 A1 | 4/2016 | Schumann et al. |
| 2018/0261806 A1 | 9/2018 | Kawate et al. |
| 2020/0212493 A1 | 7/2020 | Busacca et al. |
| 2020/0350633 A1 | 11/2020 | Busacca et al. |
| 2021/0043881 A1 | 2/2021 | Wang et al. |
| 2022/0069421 A1 | 3/2022 | Dalton et al. |
| 2022/0115711 A1 | 4/2022 | Busacca et al. |
| 2022/0320639 A1 | 10/2022 | Busacca et al. |
| 2022/0320694 A1 | 10/2022 | Busacca et al. |

FOREIGN PATENT DOCUMENTS

| | | | |
|---|---|---|---|
| EP | 2223367 | B1 | 6/2015 |
| EP | 3367468 | A1 | 8/2018 |
| EP | 3709392 | A1 | 9/2020 |
| EP | 4002536 | A1 | 5/2022 |
| EP | 4002537 | A1 | 5/2022 |
| JP | 2005347195 | A | 12/2005 |
| JP | 2008016193 | A | 1/2008 |
| JP | 2016085976 | A | 5/2016 |
| KR | 102102101 | B1 | 4/2020 |
| WO | 2013112135 | A1 | 8/2013 |
| WO | 2018020906 | A1 | 2/2018 |
| WO | 2019089492 | A1 | 5/2019 |
| WO | 2020066254 | A1 | 4/2020 |
| WO | 2022108954 | A1 | 5/2022 |
| WO | 2022109019 | A1 | 5/2022 |
| WO | 2022221056 | A2 | 10/2022 |

OTHER PUBLICATIONS

International Search Report and Written Opinion issued for PCT/US2022/022176 dated Sep. 12, 2022 (15 pages).
International Search Report and Written Opinion issued for PCT/US2022/033222 dated Oct. 7, 2022 (15 pages).
Extended European Search Report issued for EP 21208848.8 dated Apr. 22, 2022 (8 pages).
Extended European Search Report issued for EP 21208850.4 dated Apr. 20, 2022 (8 pages).

* cited by examiner

SPACERS FOR PROVIDING PROTECTION OF ELECTROCHEMICAL BATTERY ENCLOSURES AND SYSTEMS AND METHODS THEREFOR

CROSS-REFERENCE TO RELATED APPLICATIONS

This application claims priority to U.S. Provisional Patent Application No. 63/210,773, filed Jun. 15, 2021, which is hereby incorporated by reference in its entirety.

FIELD

The field of the disclosure relates generally to energy storage technology, such as battery technology. More specifically, the field of the disclosure relates to spacers for providing protection of battery enclosures, systems and methods therefor.

BACKGROUND

Lithium based secondary batteries have become desirable energy sources due to their comparatively high energy density, power and shelf life. Examples of lithium secondary batteries include non-aqueous batteries such as lithium-ion and lithium-polymer batteries.

Known energy storage devices, such as batteries, fuel cells and electrochemical capacitors, typically have two-dimensional laminar architectures, such as planar or spirally wound (i.e., jellyroll) laminate structures, where a surface area of each laminate is approximately equal to its geometric footprint (ignoring porosity and surface roughness).

Three-dimensional secondary batteries may provide increased capacity and longevity compared to laminar secondary batteries. The production of such three-dimensional secondary batteries, however, presents manufacturing and cost challenges.

During the manufacturing process of some secondary batteries, an enclosure is placed over the internal components. In some instances, the enclosure comes into contact with an edge of an internal component, causing an abrasion or rupture to the enclosure, which may reduce performance of the battery, or in worst cases cause failure of the battery or short circuit conditions. Thus, it would be desirable to produce secondary batteries while addressing the issues in the known art.

BRIEF DESCRIPTION

In one embodiment, a secondary battery for cycling between a charged state and a discharged state is disclosed. The battery comprises a constraint and an electrode assembly disposed within the constraint, wherein the electrode assembly has mutually perpendicular transverse, longitudinal, and vertical axes corresponding to x, y and z axes, respectively, of a three-dimensional Cartesian coordinate system, the electrode assembly comprises a population of unit cells comprising an electrode current collector layer, an electrode layer, a separator layer, a counter-electrode layer, and a counter-electrode current collector layer in stacked succession in the longitudinal direction, the electrode layer comprises an electrode active material, and the counter-electrode layer comprises a counter-electrode active material, wherein one of the electrode active material and the counter-electrode material is a cathodically active material and the other of the electrode active material and the counter-electrode material is an anodically active material, a subset of the unit cell population further comprising a pair of extended spacer members located in the stacked succession between the electrode current collector layer and the counter-electrode current collector layer, one of the spacer members being spaced in the transverse direction from the other extended spacer member, at least a portion of the counter-electrode active material of the counter-electrode layer being located between the spacer members such that the portion of the counter-electrode active material and the spacer members lie in a common plane defined by the x and z axes, wherein each of the extended spacer members extend a distance SD in the x-axis direction beyond an x-axis edge of the constraint.

In another embodiment, a method of manufacturing a battery assembly for use with a secondary battery is disclosed. The battery assembly has mutually perpendicular transverse, longitudinal, and vertical axes corresponding to x, y and z axes, respectively, of a three-dimensional Cartesian coordinate system. The method comprises: preparing a unit cell by stacking an electrode current collector layer, an electrode layer, a separator layer, a counter-electrode layer, and a counter-electrode current collector layer in succession in the longitudinal direction, the electrode layer comprises an electrode active material, and the counter-electrode layer comprises a counter-electrode active material, wherein one of the electrode active material and the counter-electrode material is a cathodically active material and the other of the electrode active material and the counter-electrode material is an anodically active material, and placing a population of extended spacer members in the stacked succession between the electrode current collector layer and the counter-electrode current collector layer, one of the extended spacer members being spaced in a y-axis direction from the other spacer member, the x-axis extent of the extended spacer members being a distance SD greater than the x-axis extent of the unit cell.

In yet another embodiment, an electrode assembly for a secondary battery has mutually perpendicular transverse, longitudinal, and vertical axes corresponding to x, y and z axes, respectively, of a three-dimensional Cartesian coordinate system. The electrode assembly comprises: a unit cell comprising an electrode current collector layer, an electrode layer, a separator layer, a counter-electrode layer, and a counter-electrode current collector layer in succession in the longitudinal direction, the electrode layer comprises an electrode active material, and the counter-electrode layer comprises a counter-electrode active material, wherein one of the electrode active material and the counter-electrode material is a cathodically active material and the other of the electrode active material and the counter-electrode material is an anodically active material, and a population of extended spacer members between the electrode current collector layer and the counter-electrode current collector layer, one of the extended spacer members being spaced in the y-axis direction from the other spacer member, the x-axis extent of the extended spacer members being a distance SD greater than the x-axis extent of the unit cell.

In still another embodiment, a method of manufacturing an electrode assembly for a secondary battery is disclosed. The electrode assembly has mutually perpendicular transverse, longitudinal, and vertical axes corresponding to x, y and z axes, respectively, of a three-dimensional Cartesian coordinate system. The method comprises: preparing a unit cell by stacking an electrode current collector layer, an electrode layer, a separator layer, a counter-electrode layer, and a counter-electrode current collector layer in succession in the longitudinal direction, the electrode layer comprises an electrode active material, and the counter-electrode layer comprises a counter-electrode active material, wherein one of the electrode active material and the counter-electrode material is a cathodically active material and the other of the electrode active material and the counter-electrode material is an anodically active material, and placing a population of extended spacer members between the electrode current collector layer and the counter-electrode current collector layer, one of the extended spacer members being spaced in the y-axis direction from the other spacer member; placing the unit cell within a constraint, such that, the x-axis extent of the extended spacer members being a distance SD greater than the x-axis extent of the constraint.

DEFINITIONS

Figure 1:
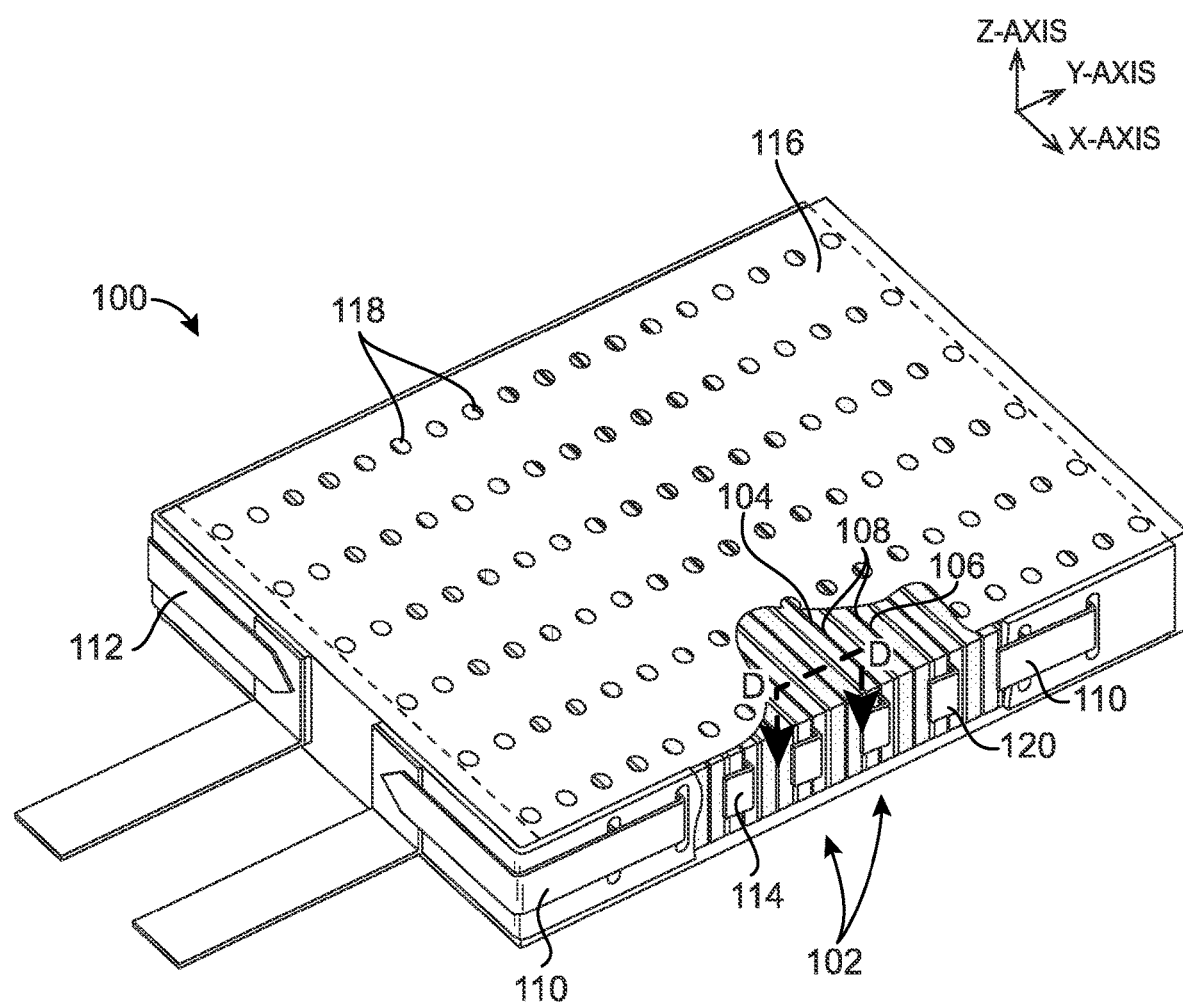
FIG. 1 is front perspective view of one suitable embodiment of a battery assembly having a cutaway portion, prior to application of an enclosure according to the present disclosure.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 μm would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Anode" as used herein in the context of a secondary battery refers to the negative electrode in a secondary battery.

"Anode material" or "Anodically active" as used herein means material suitable for use as the negative electrode of a secondary battery "Cathode" as used herein in the context of a secondary battery refers to the positive electrode in a secondary battery "Cathode material" or "Cathodically active" as used herein means material suitable for use as the positive electrode of a secondary battery.

"Conversion chemistry active material" or "Conversion chemistry material" refers to a material that undergoes a chemical reaction during the charging and discharging cycles of a secondary battery.

"Counter electrode" as used herein may refer to the negative or positive electrode (anode or cathode), opposite of the Electrode, of a secondary battery unless the context clearly indicates otherwise.

"Cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Electrochemically active material" as used herein means anodically active or cathodically active material.

"Electrode" as used herein may refer to the negative or positive electrode (anode or cathode) of a secondary battery unless the context clearly indicates otherwise.

"Electrode current collector layer" as used herein may refer to an anode (e.g., negative) current collector layer or a cathode (e.g., positive) current collector layer.

"Electrode material" as used herein may refer to anode material or cathode material unless the context clearly indicates otherwise.

"Electrode structure" as used herein may refer to an anode structure (e.g., negative electrode structure) or a cathode structure (e.g., positive electrode structure) adapted for use in a battery unless the context clearly indicates otherwise.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the disclosed subject matter herein are not limited to the particular axis or axes used to describe three-dimensional orientations of the elements. Alternatively stated, the axes may be interchangeable when referring to three-dimensional aspects of the disclosed subject matter. "Weakened region" refers to a portion of the web that has undergone a processing operation such as scoring, cutting, perforation or the like such that the local rupture strength of the weakened region is lower than the rupture strength of a non-weakened region.

DETAILED DESCRIPTION

Embodiments of the present disclosure relate to protection layers for components for batteries, such as secondary batteries, for reducing the occurrences of damage to the components to maintain the functionality, safety and/or output of the battery.

One suitable embodiment of a battery assembly, which is indicated generally at 100, is described with reference to FIG. 1. As illustrated in FIG. 1, the battery assembly 100 includes a population of adjacent electrode sub-units 102. Each electrode sub-unit 102 has a dimension in the X-axis, Y-axis and Z-axis, respectively. The X, Y and Z-axes are each mutually perpendicular, akin to a Cartesian coordinate system. As used herein, dimensions of each electrode sub-unit 102 in the Z-axis may be referred to as a "height", dimensions in the X-axis may be referred to as a "length" and dimensions in the Y-axis may be referred to as a "width." Each electrode sub-unit 102 comprises at least one anodically active material layer 104 and at least one cathodically active material layer 106. The anodically active material layer 104 and cathodically active material layer 106 are electrically isolated from each other by a separator layer 108. It should be appreciated that in suitable embodiments of the present disclosure, any number of electrode sub-units 102 may be used, such as from 1 to 200 or more sub-units in a single battery assembly 100.

With reference still to FIG. 1, the battery assembly 100 includes bus bars 110 and 112 that are in electrical contact with an anodically active layer 104 and a cathodically active layer 106 of each electrode sub-unit 102, respectively, via an electrode tab 114. Accordingly, the bus bar 110 seen in FIG. 1 may be referred to as an anode bus bar and the bus bar 112 may be referred to as a cathode bus bar. In one embodiment, a constraint 116 may be applied over one or both of the X-Y surfaces of the battery assembly 100. In the embodiment shown in FIG. 1, the constraint 116 includes a population of perforations 118 to facilitate distribution or flow of an electrolyte solution, once the battery assembly 100 has been fully assembled.

In one embodiment, each of the anodically active layer 104 and the cathodically active layer 106 may be a multi-layer material including, for example, an electrode current collector layer (i.e., an anode current collector layer or a cathode current collector layer), and an electrochemically active material layer (i.e., a layer of anodically active material or a layer of cathodically active material) on at least one major surface thereof, and in other embodiments one or more of the anodically active layer and the cathodically active layer may be a single layer of appropriate material.

Figure 2A:
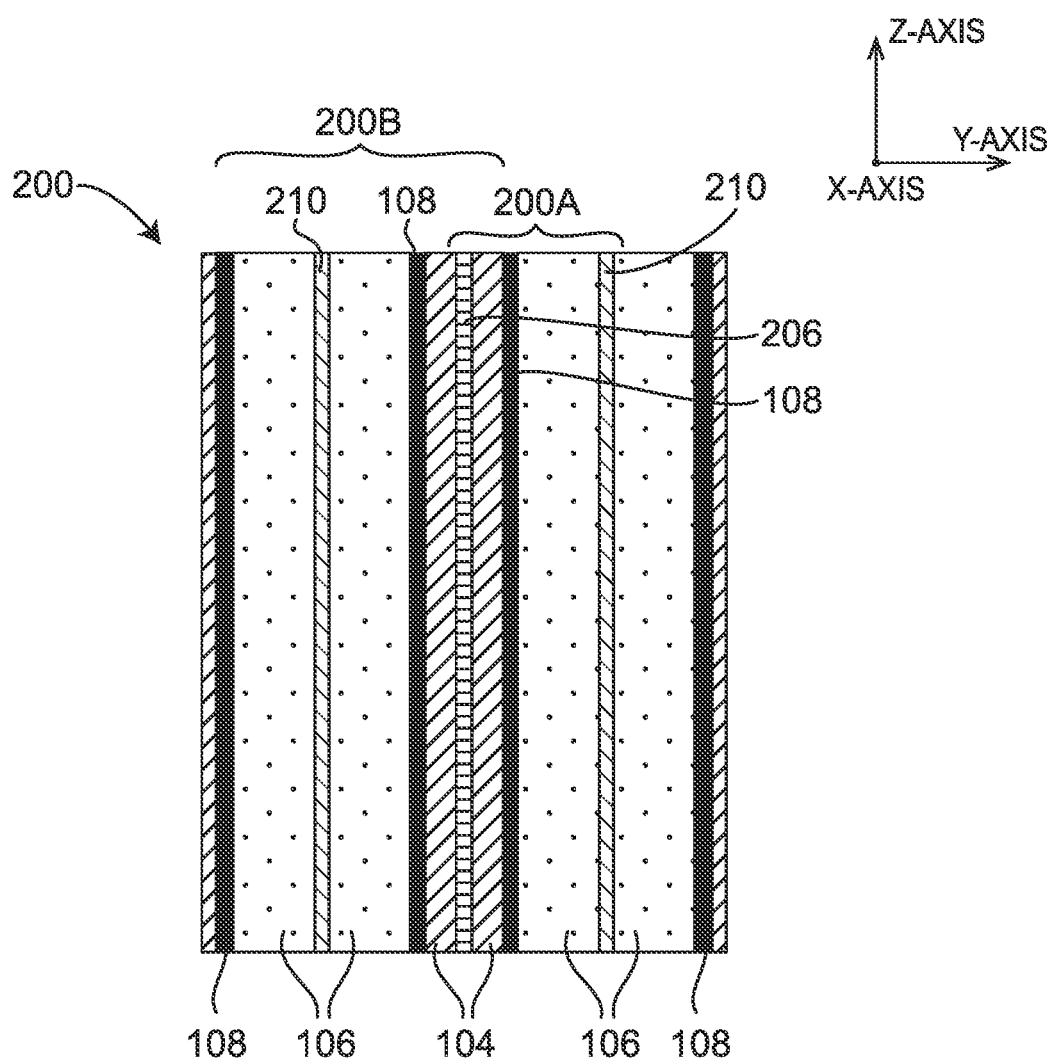
FIG. 2A is section view taken from section line D-D of an electrode assembly of FIG. 1, without an extended spacer.
Figure 2B:
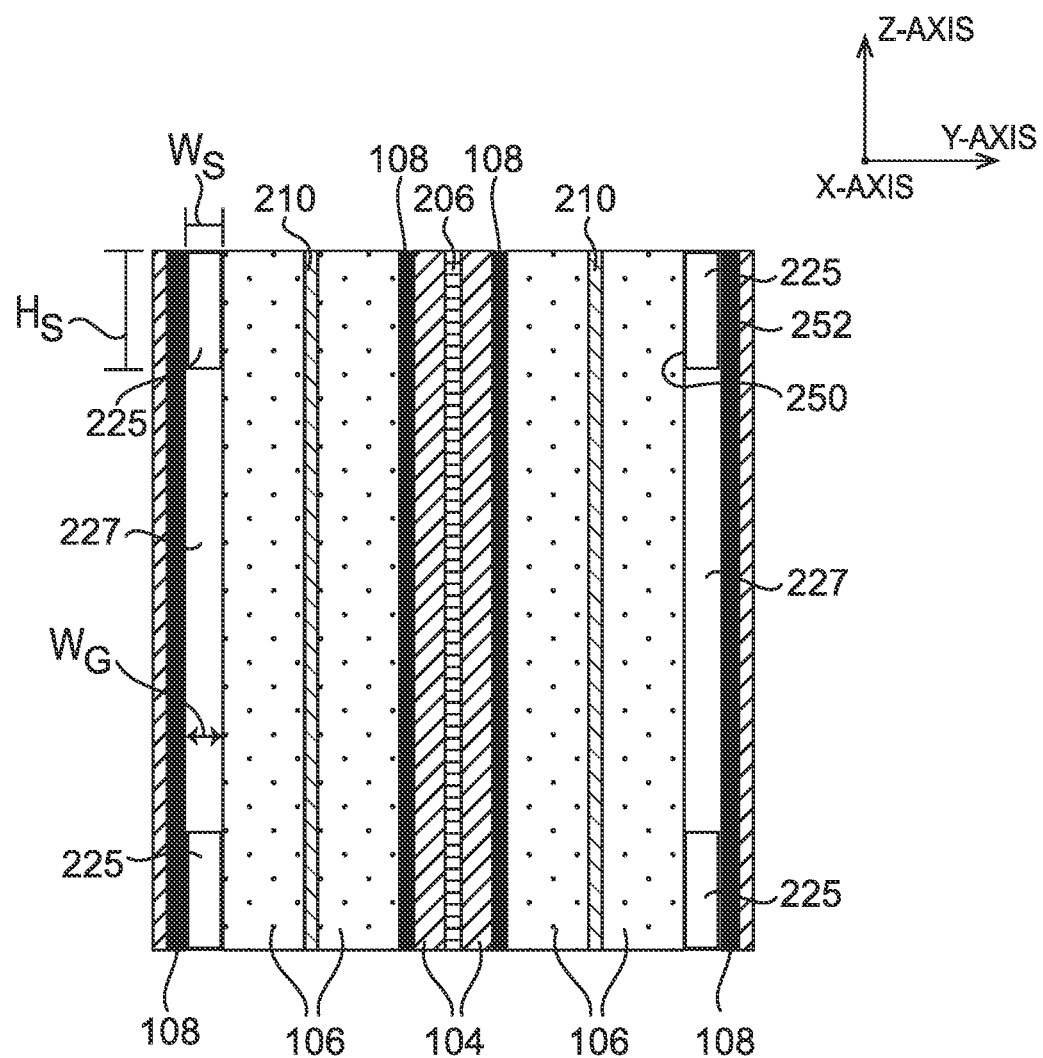
FIGS. 2B and 2C are each a section view taken from section line D-D of an electrode assembly of FIG. 1, with an extended spacer according to embodiments of the present disclosure.
Figure 2C:
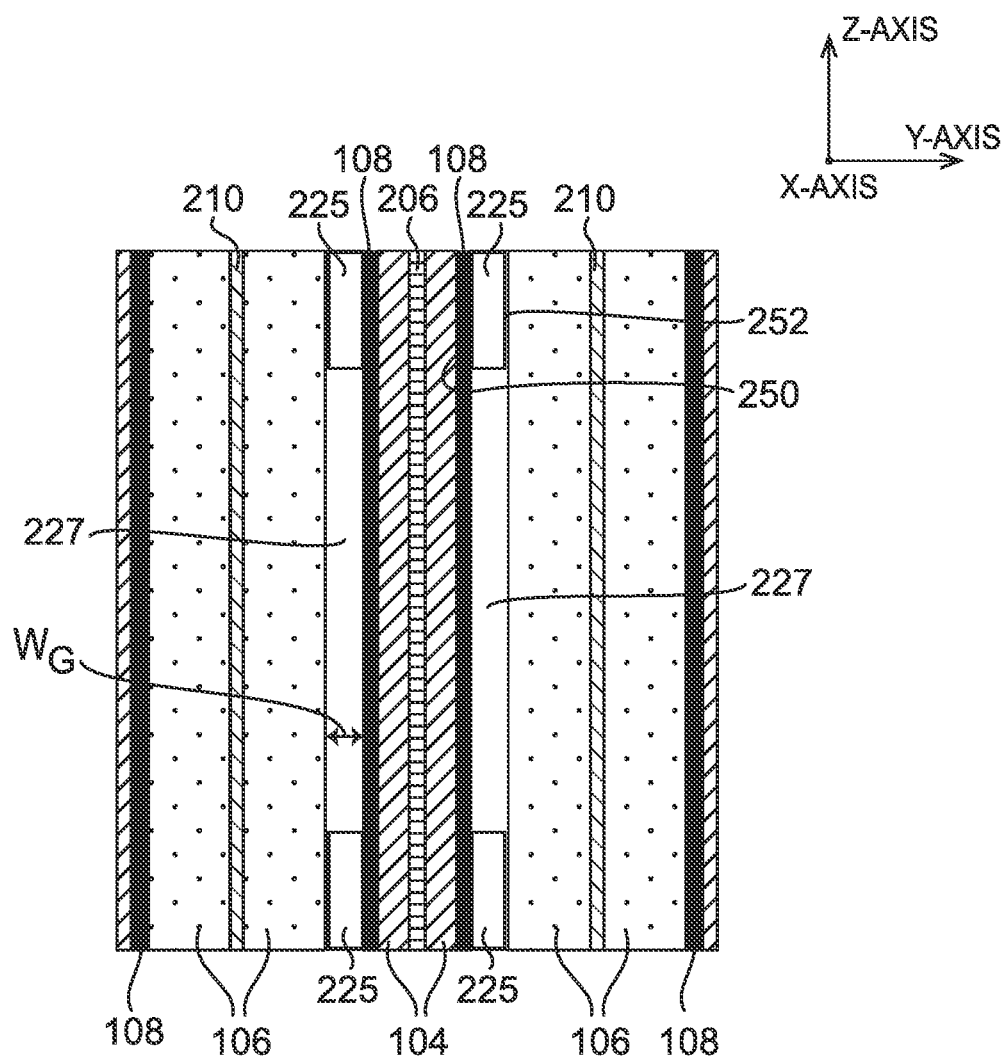

With reference to FIGS. 2A-2C, individual layers of the electrode sub-units 102, are described. For each of the electrode sub-units 102, in some embodiments, the separator layer is an ionically permeable polymeric woven material suitable for use as a separator in a secondary battery. A cross sectional view of one embodiment of a unit cell 200, which may comprise one or more sub-units 102, is shown in FIG. 2A. In this embodiment, the electrode unit cell 200 comprises anode current collector layer 206 in the center, anodically active material layer 104, separator 108, cathodically active material layer 106 and cathode current collector layer 210 in a stacked formation. In an alternative embodiment, the placement of the cathodically active material layer 106 and the anodically active material layer 104 may be swapped, such that the cathodically active material layer(s) 106 are toward the center and the anodically active material layer(s) are distal to the cathodically active material layers 106. In one embodiment, the unit cell 200A includes a cathode current collector 210, a cathodically active material layer 106, a separator 108, an anodically active material layer 104 and an anode current collector 206 in stacked succession, from right to left in the illustration of FIG. 2A. In an alternative embodiment, a unit cell 200B includes a separator 108, a first layer of cathodically active material layer 106, cathode current collector 210, a second layer of cathodically active material layer 106, a separator 108, a first layer of anodically active material layer 104, anode current collector 206, a second layer of anodically active material layer 104 and a separator 108, in stacked succession (left to right in the illustration of FIG. 2A).

In one embodiment, the anode current collector layer 206 may comprise a conductive metal such as copper, copper alloys or any other material suitable as an anode current collector layer. The anodically active material layer 104 may be formed as a first layer on a first surface of the anode current collector layer 206 and a second layer on a second opposing surface of the anode current collector layer 206. In another embodiment, the anode current collector layer 206 and anodically active material layer 104 may be intermixed. The first surface and the second opposing surface may be referred to as major surfaces, or front and back surfaces, of the layer. A major surface, as used herein, refers to the surfaces defined by the plane formed by the length of the material in X-Axis direction (not shown in FIG. 2A) and the height of the material in the Z-Axis direction.

In one embodiment, the anodically active material layer(s) 104 may each have a thickness of at least about 10 um. For example, in one embodiment, the anodically active material layer(s) 104 will (each) have a width in the Y-axis direction of at least about 40 um. By way of further example, in one such embodiment, the anodically active material layer(s) will (each) have a width of at least about 80 um. By way of further example, in one such embodiment, the anodically active material layers 104 will each have a width of at least about 120 um. Typically, however, the anodically active material layers 104 will each have a width of less than about 60 um or even less than about 30 um. As used herein, the term thickness and width may be used interchangeably to denote a measurement in the Y-axis direction.

In general, the negative electrode active material (e.g., anodically active material) may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal, and (h) combinations thereof.

Exemplary anodically active materials include carbon materials such as graphite and soft or hard carbons, or graphene (e.g., single-walled or multi-walled carbon nanotubes), or any of a range of metals, semi-metals, alloys, oxides, nitrides and compounds capable of intercalating lithium or forming an alloy with lithium. Specific examples of the metals or semi-metals capable of constituting the anode material include graphite, tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon or an alloy or oxide thereof.

In one embodiment, the anodically active material is microstructured to provide a significant void volume fraction to accommodate volume expansion and contraction as lithium ions (or other carrier ions) are incorporated into or leave the negative electrode active material during charging and discharging processes. In general, the void volume fraction of each of the anodically active material layer(s) 104 is at least 0.1. Typically, however, the void volume fraction of each of the anodically active material layer(s) is not greater than 0.8. For example, in one embodiment, the void volume fraction of each of the anodically active material layer(s) 104 is about 0.15 to about 0.75. By way of the further example, in one embodiment, the void volume fraction of (each of) the anodically active material layer(s) 104 is about 0.2 to about 0.7. By way of the further example, in one embodiment, the void volume fraction of each of the anodically active material layer(s) 104 is about 0.25 to about 0.6.

Depending upon the composition of the microstructured anodically active material and the method of its formation, the microstructured anodically active material may comprise macroporous, microporous, or mesoporous material layers or a combination thereof, such as a combination of microporous and mesoporous, or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth, and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched, or dendritic, and smooth or rough-walled. Additionally, the void volume may comprise open or closed voids, or a combination thereof. In one embodiment, the void volume comprises open voids, that is, the negative electrode active material contains voids having openings at the lateral surface of the negative electrode active material through which lithium ions (or other carrier ions) can enter or leave the anodically active material; for example, lithium ions may enter the anodically active material through the void openings after leaving the cathodically active material. In another embodiment, the void volume comprises closed voids, that is, the anodically active material contains voids that are enclosed by anodically active material. In general, open voids can provide greater interfacial surface area for the carrier ions whereas closed voids tend to be less susceptible to solid electrolyte interface while each provides room for expansion of the anodically active material upon the entry of carrier ions. In certain embodiments, therefore, it is preferred that the anodically active material comprise a combination of open and closed voids.

In one embodiment, the anodically active material comprises porous aluminum, tin or silicon or an alloy, an oxide, or a nitride thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous anodically active material will generally have a porosity fraction of at least about 0.1, but less than 0.8 and have a thickness of about 1 to about 100 micrometers. For example, in one embodiment, the anodically active material comprises porous silicon, has a thickness of about 5 to about 100 micrometers, and has a porosity fraction of about 0.15 to about 0.75. By way of further example, in one embodiment, the anodically active material comprises porous silicon, has a thickness of about 10 to about 80 micrometers, and has a porosity fraction of about 0.15 to about 0.7. By way of further example, in one such embodiment, the anodically active material comprises porous silicon, has a thickness of about 20 to about 50 micrometers, and has a porosity fraction of about 0.25 to about 0.6. By way of further example, in one embodiment, the anodically active material comprises a porous silicon alloy (such as nickel silicide), has a thickness of about 5 to about 100 micrometers, and has a porosity fraction of about 0.15 to about 0.75.

In another embodiment, the anodically active material comprises fibers of aluminum, tin or silicon, or an alloy thereof. Individual fibers may have a diameter (thickness dimension) of about 5 nm to about 10,000 nm and a length generally corresponding to the thickness of the anodically active material. Fibers (nanowires) of silicon may be formed, for example, by chemical vapor deposition or other techniques known in the art such as vapor liquid solid (VLS) growth and solid liquid solid (SLS) growth. Additionally, the anodically active material will generally have a porosity fraction of at least about 0.1, but less than 0.8 and have a thickness of about 1 to about 200 micrometers. For example, in one embodiment, the anodically active material comprises silicon nanowires, has a thickness of about 5 to about 100 micrometers, and has a porosity fraction of about 0.15 to about 0.75. By way of further example, in one embodiment, the anodically active material comprises silicon nanowires, has a thickness of about 10 to about 80 micrometers, and has a porosity fraction of about 0.15 to about 0.7. By way of further example, in one such embodiment, the anodically active material comprises silicon nanowires, has a thickness of about 20 to about 50 micrometers, and has a porosity fraction of about 0.25 to about 0.6. By way of further example, in one embodiment, the anodically active material comprises nanowires of a silicon alloy (such as nickel silicide), has a thickness of about 5 to about 100 micrometers, and has a porosity fraction of about 0.15 to about 0.75.

In yet other embodiments, the negative electrode (i.e., the electrode or the counter-electrode depending on context) or anodically active material layer 104 is coated with a particulate lithium material selected from the group consisting of stabilized lithium metal particles, e.g., lithium carbonate-stabilized lithium metal powder, lithium silicate stabilized lithium metal powder, or other source of stabilized lithium metal powder or ink. The particulate lithium material may be applied on the anodically active material layer 104 (e.g., negative electrode) by spraying, loading or otherwise disposing the lithium particulate material onto the negative electrode active material layer at a loading amount of about 0.05 to 5 mg/cm$^2$, e.g., about 0.1 to 4 mg/cm$^2$, or even about 0.5 to 3 mg/cm$^2$. The average particle size ($D_{50}$) of the lithium particulate material may be 5 to 200 µm, e.g., about 10 to 100 µm, 20 to 80 µm, or even about 30 to 50 µm. The average particle size ($D_{50}$) may be defined as a particle size corresponding to 50% in a cumulative volume-based particle size distribution curve. The average particle size ($D_{50}$) may be measured, for example, using a laser diffraction method.

In general, the anode current collector 206 will have an electrical conductivity of at least about $10^3$ Siemens/cm. For example, in one such embodiment, the anode current collector will have a conductivity of at least about $10^4$ Siemens/cm. By way of further example, in one such embodiment, the anode current collector will have a conductivity of at least about $10^5$ Siemens/cm. Exemplary electrically conductive materials suitable for use as anode current collectors 206 include metals, such as, copper, nickel, cobalt, titanium, and tungsten, and alloys thereof.

Referring again to FIGS. 2A-2C, in another suitable embodiment, the unit cell 200 includes one or more cathode current collector layer 210 and one or more cathodically active material layer 106. The cathode current collector layer 210 of the cathode material may comprise aluminum, an aluminum alloy, titanium or any other material suitable for use as a cathode current collector layer 210. The cathodically active material layer 106 may be formed as a first layer on a first surface of the cathode current collector layer 210 and a second layer on a second opposing surface of the cathode current collector layer 210. The cathodically active material layer 106 may be coated onto one or both sides of cathode current collector layer 210. Similarly, the cathodically active material layer 106 may be coated onto one or both major surfaces of cathode current collector layer 210. In another embodiment, the cathode current collector layer 210 may be intermixed with cathodically active material layer 106.

In one embodiment, the cathodically active material layer(s) 106 will each have a thickness of at least about 20 um. For example, in one embodiment, the cathodically active material layer(s) 106 will each have a thickness of at least about 40 um. By way of further example, in one such embodiment the cathodically active material layer(s) will each have a thickness of at least about 60 um. By way of further example, in one such embodiment the cathodically active material layers will each have a thickness of at least about 100 um. Typically, however, the cathodically active material layer(s) will each have a thickness of less than about 90 um or even less than about 70 um.

In one embodiment, the positive electrode (e.g., cathode) material may comprise, or may be, an intercalation-type chemistry active material, a conversion chemistry active material, or a combination thereof.

Exemplary conversion chemistry materials useful in the present disclosure include, but are not limited to, S (or $Li_2S$ in the lithiated state), LiF, Fe, Cu, Ni, $FeF_2$, $FeO_dF_{3-2d}$, $FeF_3$, $CoF_3$, $CoF_2$, $CuF_2$, $NiF_2$, where $0 \leq d \leq 0.5$, and the like.

Exemplary cathodically active materials also include any of a wide range of intercalation type cathodically active materials. For example, for a lithium-ion battery, the cathodically active material may comprise a cathodically active material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_y\text{-}Co_z)O_2$, and combinations thereof.

In general, the cathode current collector will have an electrical conductivity of at least about $10^3$ Siemens/cm. For example, in one such embodiment, the cathode current collector 210 will have a conductivity of at least about $10^4$ Siemens/cm. By way of further example, in one such embodiment, the cathode current collector 210 will have a conductivity of at least about $10^5$ Siemens/cm. Exemplary cathode current collectors include metals, such as aluminum, nickel, cobalt, titanium, and tungsten, and alloys thereof.

Referring again to FIGS. 2A-2C, in one embodiment, the electrically insulating separator layer(s) 108 is/are adapted to electrically isolate each member of the anodically active material layer 104 from each member of the cathodically active material layer 106. Electrically insulating separator layer 108 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%.

In one embodiment, the electrically insulating separator material layers 108 will each have a thickness of at least about 4 um. For example, in one embodiment, the electrically insulating separator material layer 108 will each have a thickness of at least about 8 um. By way of further example, in one such embodiment the electrically insulating separator material layer will each have a thickness of at least about 12 um. By way of further example, in one such embodiment the electrically insulating separator material layer 108 will each have a thickness of at least about 15 um. Typically, however, the electrically insulating separator material layer 108 will each have a thickness of less than about 12 um or even less than about 10 um.

In general, the separator material for the separator layer(s) 108 may be selected from a wide range of separator materials having the capacity to conduct carrier ions between the positive and negative active material of a unit cell. For example, the separator material may comprise a microporous separator material that may be permeated with a liquid, nonaqueous electrolyte. Alternatively, the separator material may comprise a gel or solid electrolyte capable of conducting carrier ions between the positive and negative electrodes of a unit cell.

In one embodiment, the separator material may comprise a polymer based electrolyte. Exemplary polymer electrolytes include PEO-based polymer electrolytes and polymer-ceramic composite electrolytes.

In another embodiment, the separator material may comprise an oxide based electrolyte. Exemplary oxide-based electrolytes include lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$) and lithium aluminum titanium phosphate ($Li_{1.4}Al_{0.4}Ti_{1.6}(PO_4)_3$).

In another embodiment, the separator material may comprise a solid electrolyte. Exemplary solid electrolytes include sulfide based electrolytes such as lithium tin phosphorus sulfide ($Li_{10}SnP_2Si_2$), lithium phosphorus sulfide ($\beta$-$Li_3PS_4$) and lithium phosphorus sulfur chloride iodide ($Li_6PS_5Cl_{0.9}I_{0.1}$).

In one embodiment, the separator material comprises a microporous separator material comprising a particulate material and a binder, and having a porosity (void fraction) of at least about 20 vol. %. The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1 \times 10^{-4}$ S/cm. By way of further example, in one embodiment, the particulate material has a conductivity for carrier ions of less than $1 \times 10^{-5}$ S/cm. By way of further example, in one embodiment, the particulate material has a conductivity for carrier ions of less than $1 \times 10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, BaO, ZnO, $ZrO_2$, BN, $Si_3N_4$, $Ge_3N_4$. See, for example, P. Arora and J. Zhang, "Battery Separators" Chemical Reviews 2004, 104, 4419-4462). In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

In an assembled energy storage device, such as battery assembly 100, the microporous separator material is permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiAsF_6$, LiCl, and LiBr; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, $\gamma$-butyrolactone, vinylene carbonate, 2-methyl-$\gamma$-butyrolactone, acetyl-$\gamma$-butyrolactone, and $\gamma$-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

In one embodiment, the microporous separator layer(s) 108 may be permeated with a non-aqueous, organic electrolyte including a mixture of a lithium salt and a high-purity organic solvent. In addition, the electrolyte may be a polymer using a polymer electrolyte or a solid electrolyte.

With further reference to FIGS. 1, 2A-2C, in one embodiment, the bus bars 110 and 112 are placed through the bus bar openings of the respective electrode or counter-electrode (e.g., anode or cathode, as the case may be) current collector tabs 120 to connect the anode current collectors 206 to one another (in a battery comprising multiple electrode unit cells), and the other of the bus bars connects the cathode current collectors 210 to one another in a battery comprising multiple electrode unit cells 200. In one embodiment, the bus bars 110, 112 are welded or otherwise electrically coupled to current collector tabs 120 that are folded down respectively, prior to welding. In one embodiment, the bus bar 110 is a copper bus bar and is welded to anode tabs of the anode current collector layer 206, and the bus bar 112 is an aluminum bus bar and is welded to cathode tabs of the cathode current collector layer 210. However, in other embodiments, the bus bars 110, 112 may be any suitable conductive material to allow battery assembly 100 to function as described herein. The welds may be made using a laser welder, friction welding, ultrasonic welding or any suitable welding method for welding the bus bars 110 and 112 to the electrode tabs 120. In one embodiment, each of the bus bars 110 and 112 are in electrical contact with all of the electrode tabs 120 for the anode and cathode, respectively.

As referred to herein, a member of the anode population comprises at least an anode current collector 206 and an anodically active material layer 104. In some embodiments, a member of an anode population comprises an anode current collector 206 and an anodically active material layer 104 disposed on each major surface of the anode current collector 206 The length of the members of the anode population members will vary depending upon the energy storage device and its intended use. In general, however, the members of the anode populations will typically have a length in the range of about 5 mm to about 500 mm. For example, in one such embodiment, the members of the anode population have a length of about 10 mm to about 250 mm. By way of further example, in one such embodiment the members of the anode population have a length of about 25 mm to about 100 mm.

The width (Y-axis extent) of the members of the anode population will also vary depending upon the energy storage device and its intended use. In general, however, each member of the anode population will typically have a width within the range of about 0.01 mm to 2.5 mm. For example, in one embodiment, the width of each member of the anode population will be in the range of about 0.025 mm to about 2 mm. By way of further example, in one embodiment, the width of each member of the anode population will be in the range of about 0.05 mm to about 1 mm.

The height (Z-axis extent) of the members of the anode population will also vary depending upon the energy storage device and its intended use. In general, however, members of the anode population will typically have a height within the range of about 0.05 mm to about 10 mm. For example, in one embodiment, the height of each member of the anode population will be in the range of about 0.05 mm to about 5 mm. By way of further example, in one embodiment, the height of each member of the anode population will be in the range of about 0.1 mm to about 1 mm. According to one embodiment, the members of the anode population include one or more first electrode members having a first height, and one or more second electrode members having a second height that is other than the first. In yet another embodiment, the different heights for the one or more first electrode members and one or more second electrode members may be selected to accommodate a predetermined shape for an electrode assembly, such as an electrode assembly shape having a different heights along one or more of the longitudinal and/or transverse axis, and/or to provide predetermined performance characteristics for the secondary battery.

In general, members of the anode population have a length (X-axis extent) that is substantially greater than each of its width and its height. For example, in one embodiment, the ratio of length to each of width and height is at least 5:1, respectively (that is, the ratio of length to width is at least 5:1, respectively and the ratio of length to height is at least 5:1, respectively), for each member of the anode population. By way of further example, in one embodiment the ratio of length to each of width and height is at least 10:1. By way of further example, in one embodiment, the ratio of length to each of width and height is at least 15:1. By way of further example, in one embodiment, the ratio of length to each of width and height is at least 20:1, for each member of the anode population.

In one embodiment, the ratio of the height to the width of the members of the anode population is at least 0.4:1, respectively. For example, in one embodiment, the ratio of height to width will be at least 2:1, respectively, for each member of the anode population. By way of further example, in one embodiment the ratio of height to width will be at least 10:1, respectively. By way of further example, in one embodiment the ratio of height to width will be at least 20:1, respectively. Typically, however, the ratio of height to width will generally be less than 1,000:1, respectively. For example, in one embodiment the ratio of height to width will be less than 500:1, respectively. By way of further example, in one embodiment the ratio of height to width will be less than 100:1, respectively. By way of further example, in one embodiment the ratio of height to width will be less than 10:1, respectively. By way of further example, in one embodiment the ratio of height to width will be in the range of about 2:1 to about 100:1, respectively, for each member of the anode population.

As referred to herein, a member of the cathode population comprises at least a cathode current collector 210 and a cathodically active material layer 106. The length of the members of the cathode population will vary depending upon the energy storage device and its intended use. In general, however, each member of the cathode population will typically have a length in the range of about 5 mm to about 500 mm. For example, in one such embodiment, each member of the cathode population has a length of about 10 mm to about 250 mm. By way of further example, in one such embodiment each member of the cathode population has a length of about 25 mm to about 100 mm.

The width (Y-axis extent) of the members of the cathode population will also vary depending upon the energy storage device and its intended use. In general, however, members of the cathode population will typically have a width within the range of about 0.01 mm to 2.5 mm. For example, in one embodiment, the width of each member of the cathode population will be in the range of about 0.025 mm to about 2 mm. By way of further example, in one embodiment, the width of each member of the cathode population will be in the range of about 0.05 mm to about 1 mm.

The height (Z-axis extent) of the members of the cathode population will also vary depending upon the energy storage device and its intended use. In general, however, members of the cathode population will typically have a height within the range of about 0.05 mm to about 10 mm. For example, in one embodiment, the height of each member of the cathode population will be in the range of about 0.05 mm to about 5 mm. By way of further example, in one embodiment, the height of each member of the cathode population will be in the range of about 0.1 mm to about 1 mm. According to one embodiment, the members of the cathode population include one or more first cathode members having a first height, and one or more second cathode members having a second height that is other than the first. In yet another embodiment, the different heights for the one or more first cathode members and one or more second cathode members may be selected to accommodate a predetermined shape for an electrode assembly, such as an electrode assembly shape having a different heights along one or more of the longitudinal and/or transverse axis, and/or to provide predetermined performance characteristics for the secondary battery.

In general, each member of the cathode population has a length (X-axis extent) that is substantially greater than its width and substantially greater than its height. For example, in one embodiment, the ratio of length to each of width and height is at least 5:1, respectively (that is, the ratio of length to width is at least 5:1, respectively and the ratio of length to height is at least 5:1, respectively), for each member of the cathode population. By way of further example, in one embodiment the ratio of length to each of width and height is at least 10:1 for each member of the cathode population. By way of further example, in one embodiment, the ratio of length to each of width and height is at least 15:1 for each member of the cathode population. By way of further example, in one embodiment, the ratio of length to each of width and height is at least 20:1 for each member of the cathode population.

In one embodiment, the ratio of the height to the width of the members of the cathode population is at least 0.4:1, respectively. For example, in one embodiment, the ratio of height to width will be at least 2:1, respectively, for each member of the cathode population. By way of further example, in one embodiment the ratio of height to width will be at least 10:1, respectively, for each member of the cathode population. By way of further example, in one embodiment the ratio of height to width will be at least 20:1, respectively, for each member of the cathode population. Typically, however, the ratio of height to width will generally be less than 1,000:1, respectively, for each member of the anode population. For example, in one embodiment the ratio of height to width will be less than 500:1, respectively, for each member of the cathode population. By way of further example, in one embodiment the ratio of height to width will be less than 100:1, respectively. By way of further example, in one embodiment the ratio of height to width will be less than 10:1, respectively. By way of further example, in one embodiment the ratio of height to width will be in the range of about 2:1 to about 100:1, respectively, for each member of the cathode population.

In one embodiment, anode current collector 206 also has an electrical conductance that is substantially greater than the electrical conductance of the negative electrode active material layer 104. It should be noted that negative electrode active material layer 104 may be the same or similar to cathodically active material layer 106. For example, in one embodiment the ratio of the electrical conductance of anode current collector 206 to the electrical conductance of the anodically active material layer 104 is at least 100:1 when there is an applied current to store energy in the device or an applied load to discharge the device. By way of further example, in some embodiments the ratio of the electrical conductance of anode current collector 206 to the electrical conductance of the anodically active material layer 104 is at least 500:1 when there is an applied current to store energy in the device or an applied load to discharge the device. By way of further example, in some embodiments the ratio of the electrical conductance of anode current collector 206 to the electrical conductance of the negative electrode active material layer is at least 1000:1 when there is an applied current to store energy in the device or an applied load to discharge the device. By way of further example, in some embodiments the ratio of the electrical conductance of anode current collector 206 to the electrical conductance of the anodically active material layer 104 is at least 5000:1 when there is an applied current to store energy in the device or an applied load to discharge the device. By way of further example, in some embodiments the ratio of the electrical conductance of anode current collector 206 to the electrical conductance of the anodically active material layer 104 is at least 10,000:1 when there is an applied current to store energy in the device or an applied load to discharge the device.

In general, the cathode current collector layer 210 may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, cathode current collector layer 210 comprises gold or an alloy thereof such as gold silicide. By way of further example, in one embodiment, cathode current collector layer 210 comprises nickel or an alloy thereof such as nickel silicide.

With reference to FIGS. 2B and 2C, embodiments of the disclosure including spacer members 225 are described. Additional description of spacer members is disclosed in U.S. Patent Application No. 63/115,266, filed Nov. 18, 2020, the entire contents of which are hereby incorporated by reference. In one embodiment, the spacer members 225 are continuous or discontinuous strips of organic or inorganic material. The spacer members 225 may be continuous or discontinuous in one or more of the Z-Axis and X-Axis. In some embodiments, the spacer members 225 comprise an electrically insulating material and/or ionically permeable polymeric woven material. In one embodiment, the spacer members 225 are made from the same material as separator 108. In some embodiments, spacer members 225 comprise polyethylene terephthalate (PET) or Polyimide (PI). In other embodiments, the spacer members 225 comprise an electrically conductive material. It is noted that although spacer members 225 are shown as four spacer members, there may be any number of spacer members 225 from 1 or more.

In some embodiments, the spacer members 225 comprise a spacer material comprising a polymeric material, a composite such as adhesive tape, electrode current collector, electrode active material, counter-electrode active material, counter-electrode current collector, separator material, or a material that is chemically inert (in the battery environment). For example, in one embodiment the spacer members 225 comprise an anodically active material having the capacity to accept carrier ions; in this embodiment, it is generally preferred that the anodically active material comprise graphite, graphene, or other anodically active material having a capacity for carrier ions that is less than one mole of carrier ion per mole of spacer material. By way of further example, in one embodiment the spacer members comprise a cathodically active material having the capacity to accept carrier ions. By way of further example, in one embodiment the spacer members may comprise a polymeric material (e.g., a homopolymer, copolymer or polymer blend); in such embodiments, the spacer member may comprise a fluoropolymer derived from monomers containing vinylidene fluoride, hexafluoropropylene, tetrafluoropropene, a polyolefin such as polyethylene, polypropylene, or polybutene, ethylene-diene-propene terpolymer, polystyrene, polymethyl methacrylate, polyethylene glycol, polyvinyl acetate, polyvinyl butyral, polyacetal, and polyethyleneglycol diacrylate, methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile, polyethylene oxide, acrylates, styrenes, epoxies, silicones, polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymetyl cellulose, acrylonitrile-styrene-butadiene copolymer, polyimide, polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations or a copolymer thereof.

In one embodiment, the spacer members 225 are in the form of an adhesive tape having a base and an adhesive layer provided on one surface of the base. The composition of the adhesive tape base is not particularly limited, and various bases known to be usable for the adhesive tape can be used. In general, plastic films are preferred and specific examples include polyolefin films such as a polyethylene, polypropylene, polyethylene terephthalate, a polybutylene terephthalate, polyphenylene sulfide, polyimide, or polyamide film. In some embodiments, polyolefin, polyethylene terephthalate and polyimide films may be preferred in terms of heat resistance and chemical resistance suitable for the battery application. The adhesive tape base may have a thickness in the range of about 4 μm to 200 μm, e.g., in the range of 6 μm to 150 μm, or even about 25 μm to 100 μm. The adhesive constituting the adhesive layer of the adhesive tape may comprise, for example, a rubber-based adhesive, an acrylic adhesive, a silicone-based adhesive or a combination thereof.

Figure 8:
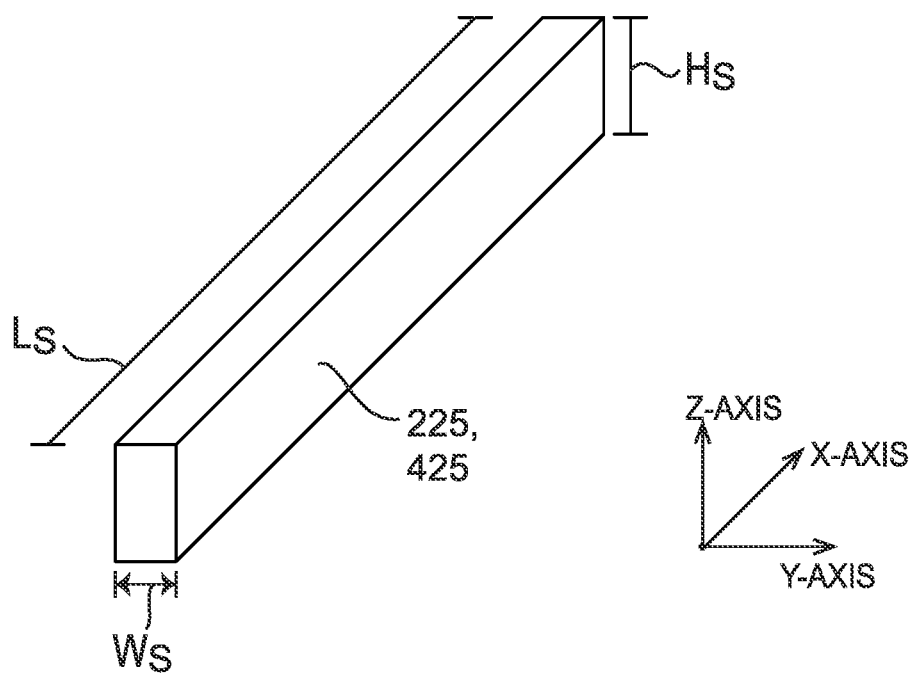
FIG. 8 is a perspective view of a spacer member according to an embodiment of the present disclosure.
Figure 9:
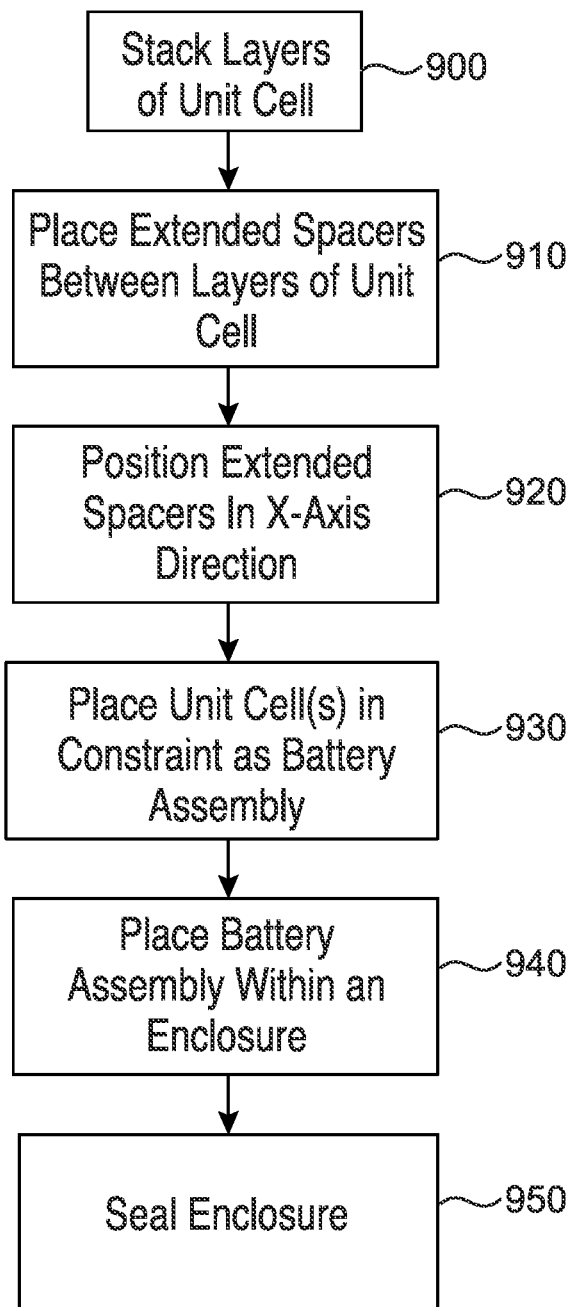
FIG. 9 is a schematic view of a method of preparing a battery assembly including an extended spacer member according to an embodiment of the present disclosure.

The spacer members 225 (and similarly extended spacer members 425) have a width $W_s$ in the Y-Axis direction, a length $L_s$ in the X-Axis direction and a height $H_s$ in the Z-Axis (FIG. 8). The width $W_s$ may be predetermined such that when an electrode unit cell is assembled, the spacer member 225 increases the distance in the Y-Axis direction, via gap 227, between adjacent layers of the unit cell (such as unit cell 200A, 200B) by a specified amount.

In one embodiment, the width $W_s$ is greater than or equal to 50 percent of the cathodically active material layer 106 width (Y-axis extent) in the Y-Axis direction. In yet another embodiment, the width $W_s$ is greater than or equal to 50 percent of the cathodically active material layer 106 plus the width (Y-axis extent) of the cathode current collector layer 210 width in the Y-Axis direction.

In one embodiment, the spacer members 225 are a tape material having an adhesive applied to first surface 250 of the spacer member 225 that secures the spacer members 225 to one of the active material layers or separator. In some embodiments, the adhesive is a strong adhesive that permanently secures the spacer members 225 to the active material layers or separator layer. In other embodiments, the adhesive is a weak adhesive that removably secures the spacer members 225 to the active material layers or separator layer. As used herein, the strong adhesive is defined as an adhesive having sufficient strength wherein the spacer member 225 cannot be removed from the active material layers or separator layer without damage to one or both of the spacer members 225 and/or the material to which it is adhered to. As used herein, a weak adhesive is defined as having sufficient strength to adhere the spacer members 225 to the active material layers or separator layer but allow the spacer members to be removed without causing material damage to at least the active material layers or separator layer. In another embodiment, the spacer member 225 has an adhesive applied to both a first surface 250 and a second opposing surface 252. In one embodiment, the spacer members 225 are applied using a printing process, such as a 3-D printing process. In still another embodiment, the spacer members 225 are applied by melting or welding the spacer members 225 to the respective layer.

In embodiments, the spacer members 225 are each of a sufficient width $W_s$ that an expansion gap 227 is defined between separator layer 108 and anodically active material layer 104 or cathodically active material layer 106. The width $W_s$ is controlled such that the expansion gap 227 has a width $W_G$ as specified. In embodiments, the width $W_G$ is set to be from 0 micrometer (e.g., no gap) to 1000 micrometers, such as 1 μm, 2 μm, 5 μm, 10 μm, 20 μm, 50 μm, 100 μm, 200 μm, 300 μm, 400 μm, 500 μm, 600 μm, 700 μm, 800 μm, 900 μm or 1000 μm, or greater.

Figure 3:
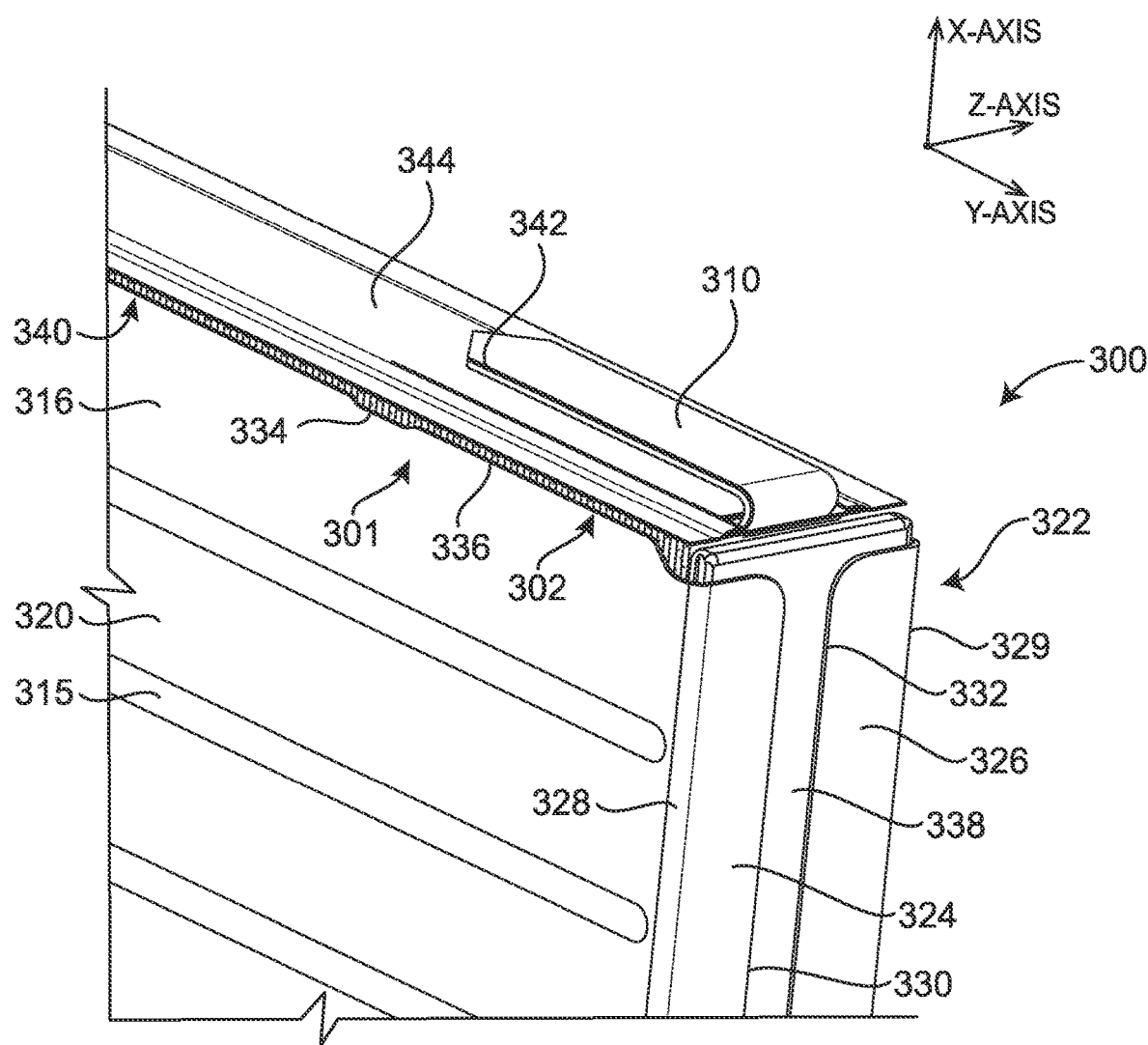
FIG. 3 is an enlarged partial perspective view of a battery assembly within a constraint according to the present disclosure.

Reference is now made to FIG. 3. FIG. 3 is an enlarged partial detail perspective view of a battery assembly 300 (which may be the same as or similar to battery assembly 100) prior to an enclosure placed thereon. The battery assembly 300 includes an electrode assembly 301 comprising a population of electrode sub-units (which may be the same or similar to sub-units 102) organized in a stacked arrangement in the Y-Axis direction, forming a population of unit cells 302 (which may be the same as or similar to unit cells 200). Each of the unit cells 302 comprises at least an electrode current conductor layer, an electrode layer comprising an electrode active material (e.g., anodically active material layer), a separator layer, a counter-electrode layer comprising a counter-electrode active material (e.g. cathodically active material layer), and a counter-electrode current collector layer.

In one suitable embodiment, the electrode assembly 301 is held within a constraint 316 (which, in some embodiments, may be the same as or similar to constraint 116). In one embodiment, the constraint 316 comprises stainless steel, such as SS316, 440C or 440C hard. In other embodiments, the constraint comprises aluminum (e.g., aluminum 7075-T6, hard H18, etc.), titanium (e.g., 6Al-4V), beryllium, beryllium copper (hard), copper ($O_2$ free, hard), nickel, other metals or metal alloys, composite, polymer, ceramic (e.g., alumina (e.g., sintered or Coorstek AD96), zirconia (e.g., Coorstek YZTP), yttriastabilizedzirconia (e.g., ENrG E-Strate®)), glass, tempered glass, polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass, (e.g., Victrex 90HMF40 or Xycomp 1000-04), polyimide (e.g., Kapton®), E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy, Kevlar 49 Aramid Fiber, S Glass Fibers, Carbon Fibers, Vectran UM LCP Fibers, Dyneema, Zylon or other suitable material.

The constraint 316 comprises a first cover 320 generally aligned along the X-Y plane, and a second cover on an opposing side of the battery assembly 300, also generally aligned along the X-Y plane, having a thickness t1 (FIG. 3A) measured in the Z-axis direction. Thickness ($t_1$) of the constraint 316 may depend upon a range of factors including, for example, the material(s) of construction of the constraint 316, the overall dimensions of the electrode assembly 301, and the composition of the electrode and counter-electrodes. In some embodiments, for example, the constraint 316 will comprise a sheet having a thickness $t_1$ in the range of about 10 to about 100 micrometers. For example, in one such embodiment, the constraint 316 comprises a stainless steel sheet (e.g., SS316) having a thickness of about 30 μm. By way of further example, in another embodiment, the constraint 316 comprises an aluminum sheet (e.g., 7075-T6) having a thickness of about 40 μm. By way of further example, in another embodiment, the constraint 316 comprises a zirconia sheet (e.g., Coorstek YZTP) having a thickness of about 30 μm. By way of further example, in another embodiment, the constraint 316 comprises an E Glass UD/Epoxy 0 deg sheet having a thickness of about 75 μm. By way of further example, in another such embodiment, the constraint 316 comprises 12 μm carbon fibers at >50% packing density. Each of the first cover 320 and second cover 322 may comprise one or more features 315, which may be formed as indentations, through cuts, holes or the like. In one embodiment, the features 315 facilitate pre-lithiation of the battery assembly 300, such as from an external lithium foil electrode (not shown). In such embodiments, the features 315 allow lithium to diffuse therethrough for the facilitation of the pre-lithiation. In one embodiment, a third cover 324 and a fourth cover 326 of constraint 316 are each generally aligned along the X-Z axis. In the embodiment shown, the third cover 324 is defined by a folded portion of the first cover 320, that has been folded at a first corner 328, and the fourth cover 326 is defined by a folded portion of the second cover 322 that has been folded at a second corner 329. The first and second corners 328 and 329 may be radiused or angular corners. In one embodiment, first and second corners 328 and 329 are angles of from 90 degrees to 100 degrees. In other embodiments, the third and fourth cover may be a single cover.

In one embodiment, a casing edge gap 338 is defined between the third cover 324 and fourth cover 326, having a gap distance defined in the Z-axis direction. In one embodiment, the gap distance of casing edge gap 338, in the z-axis direction, between the third cover 324 and fourth cover 326 is less than or equal to 50% of the z-axis thickness of the battery assembly 300. It should be noted that the opposing side of the battery assembly 300 may include similar constraints to third and fourth covers 324 and 326. The third cover 324 comprises a flap edge 330 defined along the X-axis and Z-Axis and the fourth cover 326 comprises a second flap edge 332 defined along the X-axis and Z-Axis.

Each of the first cover 320 and second cover 322 may comprise one or more notches 334 or lands 336 formed along an edge generally aligned with the Y-axis. In one embodiment, one or more of the size, shape, spacing and quantity of the notches 334 or lands 336 are determined based on manufacturing conditions or limitations. In one embodiment, the notches 334 or lands 336 may facilitate manufacturability, by easing a machining, stamping process, or tear-off of the first cover 320 or second cover 322 from a material stock used in the manufacturing process for the first cover and second cover 322. In addition, the battery assembly 300 includes bus bar(s) 310 that are electrically coupled to one of the unit cells 302. Due to the material thickness $t_1$ used for the constraint 316 the constraint comprises a constraint edge 340 that protrudes in the Z-axis direction from the electrode assembly 301. Similarly, one or more of flap edge 330 and 332 protrude in the Y-axis direction from the battery assembly 300. Additionally, the bus bar(s) 310 protrude from a side surface 344 of the battery in the X-axis direction at a bus bar edge 342. The protruding edges may in some instances create areas of friction or high stress that may puncture the package (e.g., the enclosure 700) of the battery. For example, a protruding edge having a size of approximately 50 μm×50 μm (i.e., surface area of approximately 2500 μm$^2$) with an applied force of approximately 18N (2 kgf) may create a stress of about 50 MPa. In one embodiment, battery package or enclosure 700 comprises aluminum polymer laminate and has a rupture strength of from about 30 MPa to 70 MPa. In other embodiments, battery package 700 may have a rupture strength of from 1 MPa to 300 MPa, depending on material composition of the battery package 700 and thickness thereof. These protruding areas may be referred to as potential puncture points, due to their higher likelihood of causing a puncture through the outer casing than non-protruding portions.

Figure 4A:
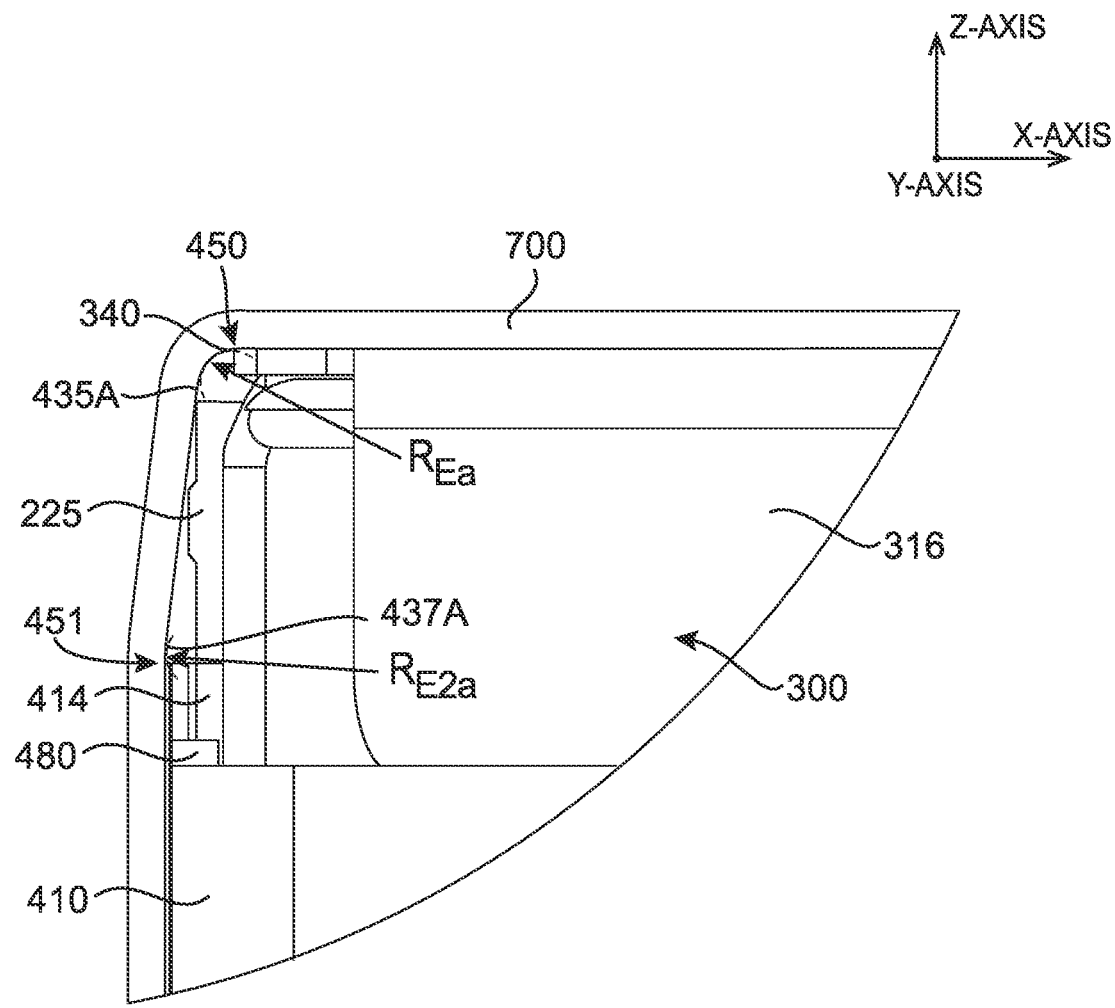
FIG. 4A is a partial view of a battery assembly without an extended spacer.

With reference to FIG. 4A, a partial detail view of a corner area of the battery assembly 300 with an enclosure 700 enclosing the battery assembly 300 that does not include an elongated spacer member (FIG. 4B), is described. In one embodiment, the battery assembly 300 includes current collector tabs 414 that comprise an opening 480 that allows bus bar 410 (which may be the same or similar to bus bars 110, 112) to pass therethrough. In this embodiment, the enclosure 700 wraps closely to protruding areas, such as constraint edge 340, and current collector tab 414 (which may be the same or similar to electrode tabs 114). Due to the enclosure 700 contacting the constraint edge 340 and/or the current collector tab 414, the enclosure may be subjected to areas of high stress 450, 451, which can in certain circumstances cause the enclosure 700 to be abraded, tear or rupture. Although shown with two areas of high stress 450, 451, any areas where the enclosure 700 contacts a sharp edge of a component of the battery assembly 300 may create other areas of high stress that may create potential puncture points.

Figure 4B:
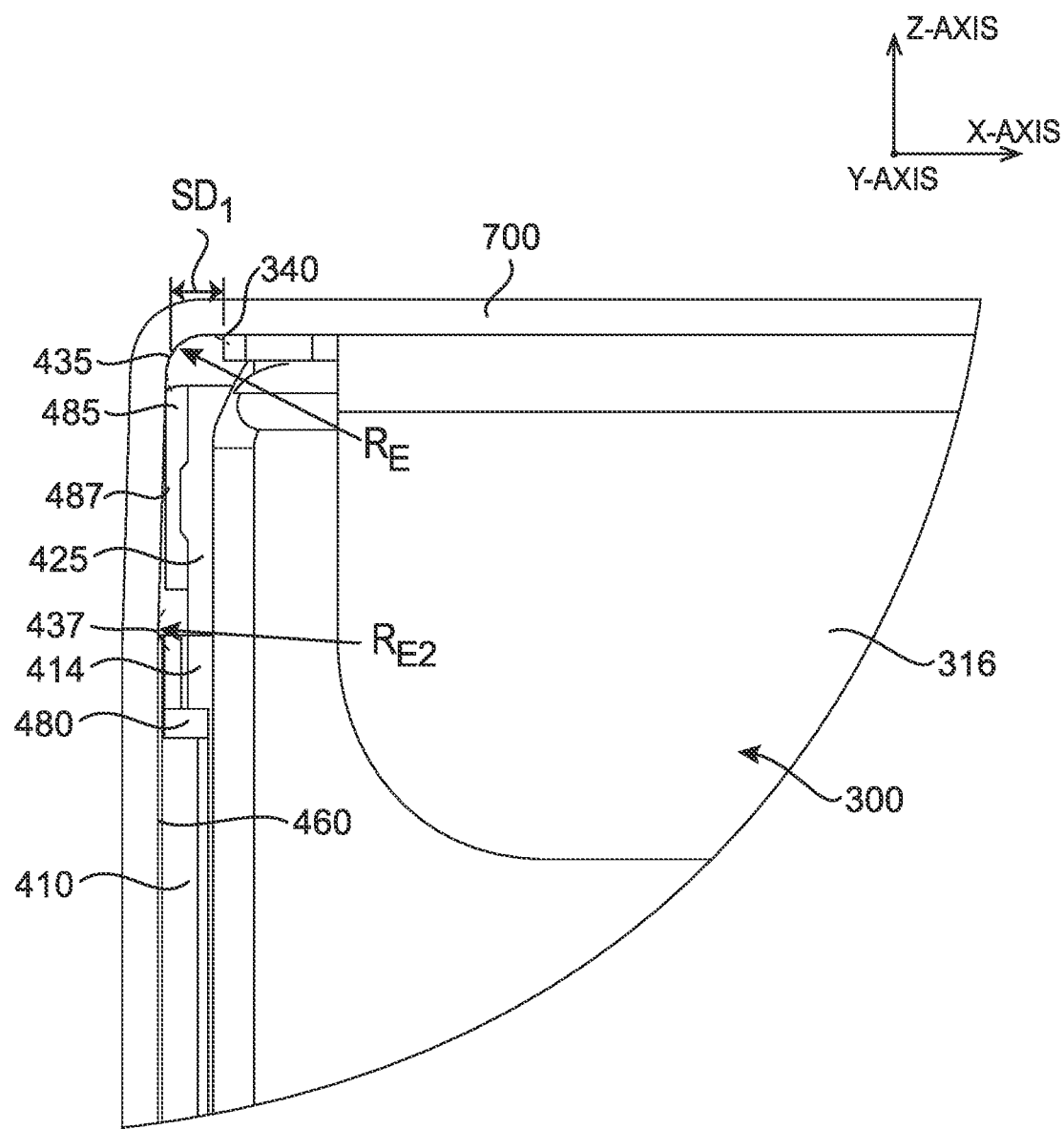
FIG. 4B is a partial view of a battery assembly including an extended spacer according to an embodiment of the disclosure.

With reference to FIG. 4B, to facilitate a reduction or elimination of the possibility of the areas of high stress 450 causing abrasions, tears or ruptures, of the enclosure 700, extended spacer members 425 are utilized. In this embodiment, the extended spacer members 425 may be equivalent in material composition, width and thickness, as well as Z-Axis direction positioning to spacer members 225 described herein. However, extended spacer members 425 are configured to extend in the X-Axis direction a length sufficient to prevent high stress areas 450 from imparting sufficient stress on enclosure 700 to cause the abrasions, tears to ruptures to enclosure 700. In this embodiment, the extended spacer members 425 are configured to have an X-Axis length that extends a distance $SD_1$ beyond the constraint edge 340 in the X-Axis direction. By doing so, a radius of curvature in the Z-X plane of the enclosure RE of the inner enclosure radius 435 is increased, as compared to the radius of curvature in the Z-X plane of the enclosure $R_{Ea}$ of the inner enclosure radius 435A of the enclosure 700 when the extended spacer is not used (FIG. 4A). In one embodiment, the distance $SD_1$ is from 100 μm to 4000 μm, such as 100 μm, 200 μm, 300 μm, 400 μm, 500 μm, 600 μm, 700 μm, 800 μm, 900 μm, 1000 μm, 1100 μm, 1200 μm, 1300 μm, 1400 μm, 1500 μm, 1600 μm, 1700 μm, 1800 μm, 1900 μm, 2000 μm, 2100 μm, 2200 μm, 2300 μm, 2400 μm, 2500 μm, 2600 μm, 2700 μm, 2800 μm, 2900 μm, 3000 μm, 3100 μm, 3200 μm, 3300 μm, 3400 μm, 3500 μm, 3600 μm, 3700 μm, 3800 μm, 3900 μm, or 4000 μm, but may be greater than or less than this range in other embodiments. In embodiments, the radius RE matches the distance $SD_1$, and accordingly, the radius RE is within a range from 100 μm to 4000 μm, such as 100 μm, 200 μm, 300 μm, 400 μm, 500 μm, 600 μm, 700 μm, 800 μm, 900 μm, 1000 μm, 1100 μm, 1200

μm, 1300 μm, 1400 μm, 1500 μm, 1600 μm, 1700 μm, 1800 μm, 1900 μm, 2000 μm, 2100 μm, 2200 μm, 2300 μm, 2400 μm, 2500 μm, 2600 μm, 2700 μm, 2800 μm, 2900 μm, 3000 μm, 3100 μm, 3200 μm, 3300 μm, 3400 μm, 3500 μm, 3600 μm, 3700 μm, 3800 μm, 3900 μm, or 4000 μm, but may be greater than or less than this range in other embodiments. In another embodiment, the extended spacer member 425 is configured to also facilitate a reduction in stress of the high stress area 451. In this embodiment, the radius of curvature $R_{E2}$ is also increased, as compared to the radius of curvature of the enclosure $R_{E2a}$ of the inner enclosure radius 437A of the enclosure 700 when the extended spacer is not used (FIG. 4A). In one embodiment, extended spacer member 425 extends a distance $SD_1$ sufficient that inner enclosure radius 437 becomes infinite (e.g., that inner package surface 460 is parallel to bus bar 410 and/or current collector tab 414.

In one embodiment, the distal ends of the extended spacer member 425 are substantially flat. In other embodiments, the distal ends of the extended spacer member 425 may comprise an edge detail 485 such as having a chamfer, or radius on one or more edges in the Z-X axis and or the X-Y axis. The extended spacer member 425 may also include one or more cutouts 487 to allow for another component, such as a bus bar or the like, to pass therethrough. In such embodiments, cutout 487 is sized and shaped to accommodate the component such that the component does not protrude in any direction beyond the extended spacer member 425.

Figure 5:
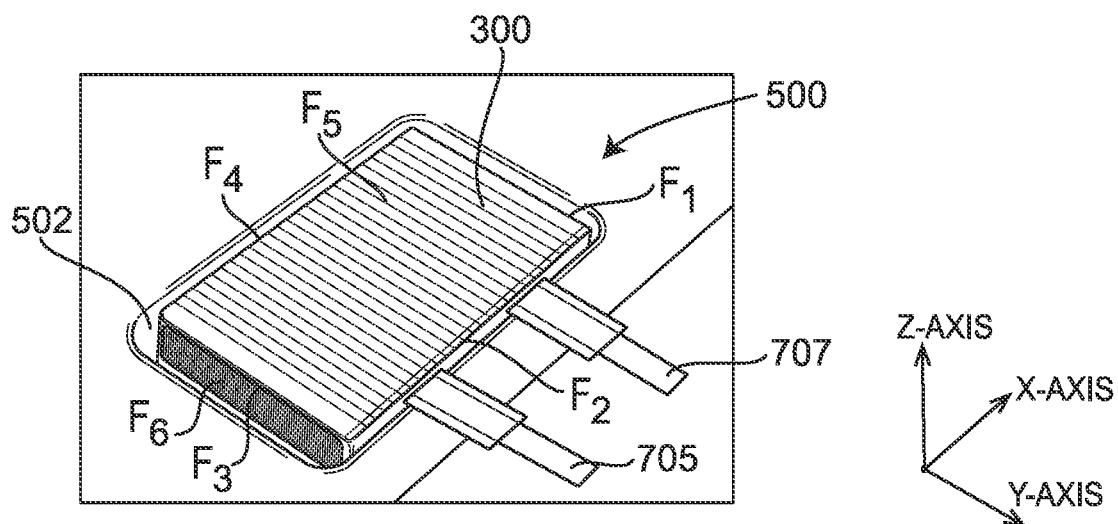
FIG. 5 is a perspective view of a battery assembly placed partially within a battery enclosure.
Figure 6:
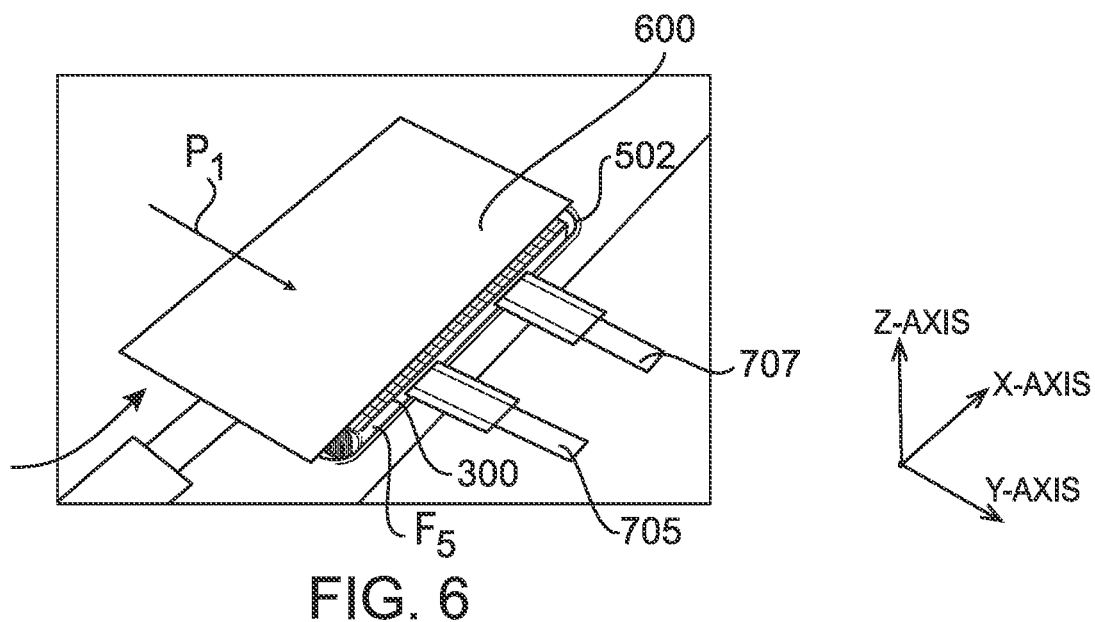
FIG. 6 is a perspective view of the battery assembly of FIG. 5 including a second cover of the battery enclosure.
Figure 7:
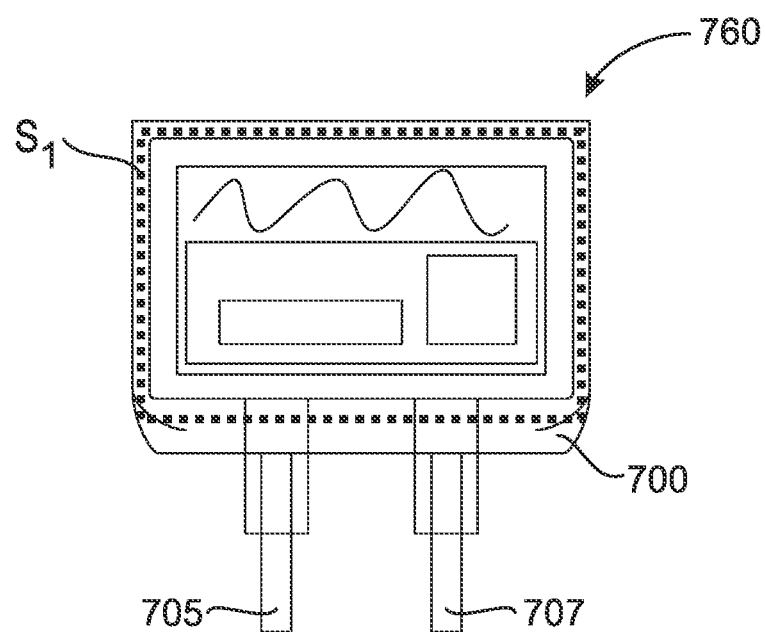
FIG. 7 is a front view of a completed battery after being sealed within the battery enclosure.

Reference is now made to FIGS. 5-7. After the battery assembly 300 has been prepared, battery assembly 300 is placed within the enclosure 700 to form a complete battery 760. In embodiments, the battery enclosure 700 comprises a first enclosure layer 500 and a second enclosure layer 600. Each of the first and second enclosure layers may comprise a flexible or semi-flexible material, such as aluminum, polymer or the like. In one embodiment, one or more of the first and second enclosure layers 500, 600 comprises a multi-layer aluminum polymer material, plastic, or the like. In one embodiment, one or more of the first and second enclosure layers 500, 600 comprises a polymer material laminated on a metal substrate, such as aluminum.

In the embodiment illustrated in FIG. 5, the battery assembly 300 is placed on the first enclosure layer 500, such that the major face $F_6$ (the underside face as shown in FIG. 5) of constraint 316 is in contact with the first enclosure layer 500. In one embodiment, the battery assembly 300 is placed within a recess 502 formed within the first enclosure layer 500. The recess 502 is sized and shaped to match the outer surface size and shape of the battery assembly 300. In one embodiment, second enclosure layer 600 is placed over battery assembly 300, such that major face $F_5$ of constraint 316 is in contact with second enclosure layer 600. The second enclosure layer 600 may be positioned (such as by movement in the placement direction $P_1$) so as to cover the entirety of the major face $F_5$ and recess 502. Conductive terminals 605 and 607 remain uncovered by first and second enclosure layers 500, 600. After proper placement of the second enclosure layer 600, the first and second enclosure layers 500, 600 are sealed along sealing edge $S_1$ (denoted by the dotted line in FIG. 7). In one embodiment, excess material of first and second enclosure layers 500, 600 may be trimmed prior to, or subsequently to, sealing. The first and second enclosure layers may be sealed along sealing edge $S_1$ by welding, heat sealing, adhesive, combinations thereof, or the like. In another embodiment, the first and second enclosure layers 500, 600 may be sealed along three sides of sealing edge $S_1$ creating a pocket therein. In such embodiment, the battery assembly 300 may be placed within the pocket, and the final edge of sealing edge $S_1$ is subsequently sealed. In one embodiment, the sealing edge $S_1$ is sealed using a hot press, that applies a controlled temperature and pressure to the sealing edge $S_1$ causing the first and second enclosure layers 500, 600 to adhere or fuse together along sealing edge $S_1$. In another embodiment, a vacuum is applied to the battery assembly 300 during the sealing process to evacuate any excess volume occupied by air or other gas. The time for which the sealing edge is subject to the hot press may be controlled and is dependent upon the materials selected for the first and second enclosure layers 500, 600. Once sealed over battery assembly 300, the sealed first and second enclosure layers 500, 600 form battery package 700. Upon sealing, enclosure 700 is liquid tight and/or air tight, depending on the desired application. The terminals 705, 707 remain exposed, and are not covered by enclosure 700 to allow a user to connect the terminals to a device to be powered, or to a battery charger.

In some embodiments, prior to sealing the enclosure 700, a vacuum is applied to the interior of enclosure 700, such that the enclosure substantially conforms to the outer surfaces of the battery assembly 300. In this embodiment, the extended spacer members 425 should have sufficient distance $SD_1$ beyond the constraint edge 340 in the X-Axis direction such that after application of the vacuum and subsequent sealing, the radii Re and $RE_2$ are sufficiently large to reduce or eliminate high stress areas 450 and 451 from having sufficient stress to cause abrasions, tears or ruptures to enclosure 700.

Methods of the current disclosure are now described with reference to FIGS. 1-9. In one embodiment, a battery assembly, such as battery assembly 300, is prepared as described hereinabove by stacking 900 one or more layers of unit cells 200. To facilitate a reduction or elimination of the possibility of the areas of high stress 450 causing abrasions, tears or ruptures, of the enclosure 700, extended spacer members 425 are placed 910 within the unit cells within the battery assembly. In this embodiment, the extended spacer members, such as extended spacer members 425, may be equivalent in material composition, width and thickness, as well as Z-Axis direction positioning to spacer members 225 described herein. In this embodiment, the extended spacer members 425 are assembled and positioned 920 within the unit cells to extend in the X-Axis direction a length sufficient to prevent high stress areas 450 from imparting sufficient stress on enclosure 700 to cause the abrasions, tears to ruptures to enclosure 700. In this embodiment of the method, the extended spacer members 425 are configured and positioned 920 within the unit cells to have an X-Axis length that extends a distance SD' beyond the constraint edge 340 in the X-Axis direction. By doing so, a radius of curvature of the enclosure RE of the inner enclosure radius 435 is increased, as compared to the radius of curvature of the enclosure $R_{Ea}$ of the inner enclosure radius 435A of the enclosure 700 when the extended spacer is not used (FIG. 4A). In one embodiment, the distance $SD_1$ is from 100 μm to 4000 μm, such as 100 μm, 200 μm, 300 μm, 400 μm, 500 μm, 600 μm, 700 μm, 800 μm, 900 μm, 1000 μm, 1100 μm, 1200 μm, 1300 μm, 1400 μm, 1500 μm, 1600 μm, 1700 μm, 1800 μm, 1900 μm, 2000 μm, 2100 μm, 2200 μm, 2300 μm, 2400 μm, 2500 μm, 2600 μm, 2700 μm, 2800 μm, 2900 μm, 3000 μm, 3100 μm, 3200 μm, 3300 μm, 3400 μm, 3500 μm, 3600 μm, 3700 μm, 3800 μm, 3900 μm, or 4000 μm, but may be greater than or less than this range in other embodiments. In embodiments, the radius RE matches the distance $SD_1$, and accordingly, the radius RE is within a range from 100

μm to 4000 μm, such as 100 μm, 200 μm, 300 μm, 400 μm, 500 μm, 600 μm, 700 μm, 800 μm, 900 μm, 1000 μm, 1100 μm, 1200 μm, 1300 μm, 1400 μm, 1500 μm, 1600 μm, 1700 μm, 1800 μm, 1900 μm, 2000 μm, 2100 μm, 2200 μm, 2300 μm, 2400 μm, 2500 μm, 2600 μm, 2700 μm, 2800 μm, 2900 μm, 3000 μm, 3100 μm, 3200 μm, 3300 μm, 3400 μm, 3500 μm, 3600 μm, 3700 μm, 3800 μm, 3900 μm, or 4000 μm, but may be greater than or less than this range in other embodiments. In another embodiment of the method, the extended spacer member 425 is configured and placed 910 within the unit cell to also facilitate a reduction in stress of the high stress area 451. In this embodiment, the radius of curvature $R_{E2}$ is also increased by placement of the extended spacer member, as compared to the radius of curvature of the enclosure $R_{E2a}$ of the inner enclosure radius 437A of the enclosure 700 when the extended spacer is not used (FIG. 4A). In one embodiment, extended spacer member 425 is placed to extend a distance $SD_1$ sufficient that inner enclosure radius 437 becomes infinite (e.g., that inner package surface 460 is substantially parallel to bus bar 410 and/or current collector tab 414).

In one embodiment of the method, after the battery assembly 300 has been prepared, battery assembly 300 is placed 930 within a constraint, as described hereinabove. Subsequently, the battery assembly 300 within the constraint is placed 940 within the enclosure 700 to form a complete battery 760. In embodiments, the battery enclosure 700 comprises a first enclosure layer 500 and a second enclosure layer 600. In some embodiments of the method, prior to sealing 950 the enclosure 700, a vacuum is applied to the interior of enclosure 700, such that the enclosure substantially conforms to the outer surfaces of the battery assembly 300. In this embodiment, the extended spacer members 425 should have sufficient distance $SD_1$ beyond the constraint edge 340 in the X-Axis direction such that after application of the vacuum and subsequent sealing 950, the radii Re and $RE_2$ are sufficiently large to reduce or eliminate high stress areas 450 and 451 from having sufficient stress to cause abrasions, tears or ruptures to enclosure 700.

In one embodiment, the battery assembly 300 is placed on the first enclosure layer 500, such that the major face $F_6$ (the underside face as shown in FIG. 5) of constraint 316 is in contact with the first enclosure layer 500. In one embodiment of the method, the battery assembly 300 is placed within a recess 502 formed within the first enclosure layer 500. The recess 502 is sized and shaped to match the outer surface size and shape of the battery assembly 300. In one embodiment of the method, second enclosure layer 600 is placed over battery assembly 300, such that major face $F_5$ of constraint 316 is in contact with second enclosure layer 600. The second enclosure layer 600 is positioned (such as by movement in the placement direction $P_1$) so as to cover the entirety of the major face $F_5$ and recess 502. Conductive terminals 605 and 607 are positioned to remain uncovered by first and second enclosure layers 500, 600. After proper placement of the second enclosure layer 600, the first and second enclosure layers 500,600 are sealed 950 along sealing edge $S_1$ (denoted by the dotted line in FIG. 7), for example by heat sealing, heat staking or the like. In one embodiment of the method, excess material of first and second enclosure layers 500, 600 is trimmed prior to, or subsequently to, the sealing. In another embodiment, the first and second enclosure layers 500,600 are sealed along three sides of sealing edge $S_1$ creating a pocket therein. In such embodiment, the battery assembly 300 is then placed within the pocket, and the final edge of sealing edge $S_1$ is subsequently sealed. In one embodiment of the method, the sealing edge $S_1$ is sealed using a hot press, that applies a controlled temperature and pressure to the sealing edge $S_1$ causing the first and second enclosure layers 500, 600 to adhere or fuse together along sealing edge $S_1$. In another embodiment, a vacuum is applied to the battery assembly 300 during the sealing process to evacuate any excess volume occupied by air or other gas. The time for which the sealing edge is subject to the hot press may be controlled and is dependent upon the materials selected for the first and second enclosure layers 500, 600. Once sealed over battery assembly 300, the sealed first and second enclosure layers 500, 600 form battery package 700. Upon sealing 950, enclosure 700 is liquid tight and/or air tight, depending on the desired application. The terminals 705, 707 remain exposed, and are not covered by enclosure 700 to allow a user to connect the terminals to a device to be powered, or to a battery charger. Enclosure 700 may also be referred to as a battery package.

The following embodiments are provided to illustrate aspects of the disclosure, although the embodiments are not intended to be limiting and other aspects and/or embodiments may also be provided.

Embodiment 1. A secondary battery for cycling between a charged state and a discharged state, the battery comprising a constraint and an electrode assembly disposed within the constraint, wherein the electrode assembly has mutually perpendicular transverse, longitudinal, and vertical axes corresponding to x, y and z axes, respectively, of a three-dimensional Cartesian coordinate system, the electrode assembly comprises a population of unit cells comprising an electrode current collector layer, an electrode layer, a separator layer, a counter-electrode layer, and a counter-electrode current collector layer in stacked succession in the longitudinal direction, the electrode layer comprises an electrode active material, and the counter-electrode layer comprises a counter-electrode active material, wherein one of the electrode active material and the counter-electrode material is a cathodically active material and the other of the electrode active material and the counter-electrode material is an anodically active material, a subset of the unit cell population further comprising a pair of extended spacer members located in the stacked succession between the electrode current collector layer and the counter-electrode current collector layer, one of the spacer members being spaced in the transverse direction from the other extended spacer member, at least a portion of the counter-electrode active material of the counter-electrode layer being located between the spacer members such that the portion of the counter-electrode active material and the spacer members lie in a common plane defined by the x and z axes, wherein each of the extended spacer members extend a distance SD in the x-axis direction beyond an x-axis edge of the constraint.

Embodiment 2. The secondary battery set forth in embodiment 1 wherein the distance SD is up to 4 mm.

Embodiment 3. The secondary battery set forth in any prior embodiment, wherein the electrode assembly and constraint are disposed within a sealed enclosure.

Embodiment 4. The secondary battery set forth in any prior embodiment wherein the extended spacer members facilitate a radius of curvature of an inner surface of the enclosure around the x-axis edge of the constraint of up to 3 mm.

Embodiment 5. The secondary battery set forth in any prior embodiment wherein the extended spacer members have a length extending in the X-axis direction, the length of the spacer members being equal to or less than 3000 um.

Embodiment 6. The secondary battery set forth in any prior embodiment wherein the electrode material is a cathodically active material, and the counter-electrode active material is an anodically active material.

Embodiment 7. The secondary battery set forth in any prior embodiment wherein the extended spacer members are disposed between the separator layer and the electrode layer.

Embodiment 8. The secondary battery set forth in any prior embodiment wherein the spacer members are disposed between the separator layer and the electrode current collector layer.

Embodiment 9. The secondary battery set forth in any prior embodiment wherein the spacer members are disposed between the separator and the counter-electrode layer.

Embodiment 10. The secondary battery set forth in any prior embodiment wherein the spacer members are disposed between the separator layer and the counter-electrode current collector layer.

Embodiment 11. The secondary battery set forth in any prior embodiment wherein the extended spacer members are adhered to at least one of the electrode current collector layer, the electrode layer, the separator layer, the counter-electrode layer, and the counter-electrode current collector layer.

Embodiment 12. The secondary battery set forth in any prior embodiment wherein the spacer members are adhered to the electrode current collector layer.

Embodiment 13. The secondary battery set forth in any prior embodiment wherein the spacer members are adhered to the electrode layer.

Embodiment 14. The secondary battery set forth in any prior embodiment wherein the spacer members are adhered to the separator layer.

Embodiment 15. The secondary battery set forth in any prior embodiment wherein the spacer members are adhered to the counter-electrode current collector layer.

Embodiment 16. The secondary battery set forth in any prior embodiment wherein (i) the members of the unit cell population are in stacked succession in the longitudinal direction, (ii) the unit cell population comprises two sets of adjacent pairs of unit cells (iii) one of the two sets of the adjacent pairs share a common electrode current collector layer and the other of the two sets of the adjacent pairs share a common counter-electrode current collector layer.

Embodiment 17. The secondary battery set forth in any prior embodiment wherein the unit cell population comprises at least 5 members.

Embodiment 18. The secondary battery set forth in any prior embodiment wherein the unit cell population comprises at least 10 members.

Embodiment 19. The secondary battery set forth in any prior embodiment wherein the unit cell population comprises at least 25 members.

Embodiment 20. The secondary battery set forth in any prior embodiment wherein the unit cell population comprises at least 50 members.

Embodiment 21. The secondary battery set forth in any prior embodiment wherein the unit cell population comprises at least 100 members.

Embodiment 22. The secondary battery set forth in any prior embodiment wherein the unit cell population comprises at least 250 members.

Embodiment 23. The secondary battery set forth in any prior embodiment wherein the unit cell population comprises at least 500 members.

Embodiment 24. The secondary battery set forth in any prior embodiment wherein the extended spacer members comprise an electrically insulating material.

Embodiment 25. The secondary battery set forth in any prior embodiment wherein the extended spacer members comprise an anodically active material.

Embodiment 26. The secondary battery set forth in any prior embodiment wherein the extended spacer members comprise an anodically active material having a capacity for carrier ions that is less than one mole of carrier ion per mole of spacer material.

Embodiment 27. The secondary battery set forth in any prior embodiment wherein the extended spacer members comprise graphite or graphene.

Embodiment 28. The secondary battery set forth in any prior embodiment wherein the extended spacer members comprise a cathodically active material.

Embodiment 29. The secondary battery set forth in any prior embodiment wherein the extended spacer members comprise a polymeric material.

Embodiment 30. The secondary battery set forth in any prior embodiment wherein the extended spacer members comprise a homopolymer, copolymer or polymer blend).

Embodiment 31. The secondary battery set forth in any prior embodiment wherein the extended spacer members comprise a fluoropolymer derived from monomers containing vinylidene fluoride, hexafluoropropylene, tetrafluoropropene, a polyolefin such as polyethylene, polypropylene, or polybutene, ethylene-diene-propene terpolymer, polystyrene, polymethyl methacrylate, polyethylene glycol, polyvinyl acetate, polyvinyl butyral, polyacetal, and polyethyleneglycol diacrylate, methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile, polyethylene oxide, acrylates, styrenes, epoxies, silicones, polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymetyl cellulose, acrylonitrile-styrene-butadiene copolymer, polyimide, polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations or a copolymer thereof.

Embodiment 32. The secondary battery set forth in any prior embodiment wherein the extended spacer members comprise a fluoropolymer.

Embodiment 33. The secondary battery set forth in any prior embodiment wherein the extended spacer members comprise a polyolefin.

Embodiment 34. The secondary battery set forth in any prior embodiment wherein the extended spacer members comprise a polyolefin selected from the group consisting of homopolymers, copolymers and polymer blends of polyethylene, polypropylene, and polybutene.

Embodiment 35. The secondary battery set forth in any prior embodiment wherein the extended spacer members comprise polyethylene or polypropylene.

Embodiment 36. The secondary battery set forth in any prior embodiment wherein the extended spacer members comprise an adhesive tape having a base and an adhesive layer provided on one surface of the base.

Embodiment 37. The secondary battery set forth in any prior embodiment wherein the extended spacer members comprise an adhesive tape having a base and an adhesive layer provided on one surface of the base wherein the adhesive tape base comprises a polymeric film selected from the group consisting of polyethylene, polypropylene, polyethylene terephthalate, polybutylene terephthalate, polyphenylene sulfide, polyimide, and polyamide films, and combinations, thereof.

Embodiment 38. The secondary battery set forth in any prior embodiment wherein the extended spacer members comprise an adhesive tape having a base and an adhesive layer provided on one surface of the base wherein the adhesive tape base comprises a polymeric film selected from the group consisting of polyolefin, polyethylene terephthalate and polyimide films.

Embodiment 39. The secondary battery set forth in any prior embodiment wherein the extended spacer members comprise an adhesive tape having a base and an adhesive layer provided on one surface of the base wherein the adhesive tape base has a thickness in the range of about 4 to 200 µm.

Embodiment 40. The secondary battery set forth in any prior embodiment wherein the extended spacer members comprise an adhesive tape having a base and an adhesive layer provided on one surface of the base wherein the adhesive tape base has a thickness in the range of about 6 to 150 µm.

Embodiment 41. The secondary battery set forth in any prior embodiment wherein the extended spacer members comprise an adhesive tape having a base and an adhesive layer provided on one surface of the base wherein the adhesive tape base has a thickness in the range of about 25 to 100 µm.

Embodiment 42. The secondary battery set forth in any prior embodiment wherein the extended spacer members comprise an adhesive tape having a base and an adhesive layer provided on one surface of the base wherein the adhesive constituting the adhesive layer of the adhesive tape comprises a rubber-based adhesive, an acrylic adhesive, a silicone-based adhesive or a combination thereof.

Embodiment 43. The secondary battery set forth in any prior embodiment wherein the extended spacer members comprise the same material as the separator layer.

Embodiment 44. The secondary battery set forth in any prior embodiment wherein the extended spacer members comprise an electrically conductive material.

Embodiment 45. The secondary battery set forth in any prior embodiment wherein the extended spacer members comprise the same material as the electrode layer.

Embodiment 46. The secondary battery set forth in any prior embodiment wherein the extended spacer members define, in part, a length terminus of the unit cell.

Embodiment 47. The secondary battery set forth in any prior embodiment, wherein the extended spacer members have a total length greater than a total length of the electrode layer measured in the x-axis direction.

Embodiment 48. The secondary battery set forth in any prior embodiment, wherein the extended spacer members have a total length greater than a total length of the counter-electrode layer measured in the x-axis direction.

Embodiment 49. The secondary battery set forth in any prior embodiment wherein the unit cell has a height measured in the vertical direction and the extended spacer members have a height measured in the z-axis direction, the height of the unit cell being equal to the height of the extended spacer members.

Embodiment 50. The secondary battery set forth in any prior embodiment wherein the unit cell has a height measured in the z-axis direction and the extended spacer members have a height measured in the z-axis direction, the height of the unit cell being greater than the height of the spacer members.

Embodiment 51. The secondary battery set forth in any prior embodiment wherein the unit cell has a height measured in the z-axis direction and the spacer members have a height measured in the z-axis direction, the height of the unit cell being less than the height of the spacer members.

Embodiment 52. The secondary battery set forth in any prior embodiment wherein one of the electrode active material and the counter-electrode material is an anodically active material selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal; and (h) combinations thereof.

Embodiment 53. The secondary battery set forth in any prior embodiment wherein one of the electrode active material and the counter-electrode material is an anodically active material selected from the group consisting of silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd).

Embodiment 54. The secondary battery set forth in any prior embodiment wherein one of the electrode active material and the counter-electrode material is an anodically active material selected from the group consisting of alloys and intermetallic compounds of Si, Ge, Sn, Pb, Sb, Bi, Zn, Al, Ti, Ni, Co, or Cd with other elements.

Embodiment 55. The secondary battery set forth in any prior embodiment wherein one of the electrode active material and the counter-electrode material is an anodically active material selected from the group consisting of oxides, carbides, nitrides, sulfides, phosphides, selenides, and tellurides of Si, Ge, Sn, Pb, Sb, Bi, Zn, Al, Ti, Fe, Ni, Co, V, and Cd.

Embodiment 56. The secondary battery set forth in any prior embodiment wherein one of the electrode active material and the counter-electrode material is an anodically active material selected from the group consisting of oxides, carbides, nitrides, sulfides, phosphides, selenides, and tellurides of Si.

Embodiment 57. The secondary battery set forth in any prior embodiment wherein one of the electrode active material and the counter-electrode material is an anodically active material selected from the group consisting of silicon and the oxides and carbides of silicon.

Embodiment 58. The secondary battery set forth in any prior embodiment wherein one of the electrode active material and the counter-electrode material is anodically active material comprising lithium metal.

Embodiment 59. The secondary battery set forth in any prior embodiment wherein one of the electrode active material and the counter-electrode material is an anodically active material selected from the group consisting of graphite and carbon.

Embodiment 60. The secondary battery set forth in any prior embodiment wherein within the enclosure the secondary battery further comprises a non-aqueous, organic electrolyte.

Embodiment 61. The secondary battery set forth in any prior embodiment wherein within the enclosure the secondary battery further comprises a non-aqueous electrolyte comprising a mixture of a lithium salt and an organic solvent.

Embodiment 62. The secondary battery set forth in any prior embodiment wherein within the enclosure the secondary battery further comprises a polymer electrolyte.

Embodiment 63. The secondary battery set forth in any prior embodiment wherein within the enclosure the secondary battery further comprises a solid electrolyte.

Embodiment 64. The secondary battery set forth in any prior embodiment wherein within the enclosure the secondary battery further comprises a solid electrolyte selected from the group consisting of sulfide-based electrolytes.

Embodiment 65. The secondary battery set forth in any prior embodiment wherein within the enclosure the secondary battery further comprises a solid electrolyte selected from the group consisting of lithium tin phosphorus sulfide ($Li_{10}SnP_2S_{12}$), lithium phosphorus sulfide ($\beta$-$Li_3PS_4$) and lithium phosphorus sulfur chloride iodide ($Li_6PS_5Cl_{0.9}I_{0.1}$).

Embodiment 66. The secondary battery set forth in any prior embodiment wherein within the enclosure the secondary battery further comprises a polymer based electrolyte.

Embodiment 67. The secondary battery set forth in any prior embodiment wherein within the enclosure the secondary battery further comprises a polymer electrolyte selected from the group consisting of PEO-based polymer electrolyte, polymer-ceramic composite electrolyte (solid), and other polymer-ceramic composite electrolytes.

Embodiment 68. The secondary battery set forth in any prior embodiment wherein within the enclosure the secondary battery further comprises a solid electrolyte selected from the group consisting of oxide based electrolytes.

Embodiment 69. The secondary battery set forth in any prior embodiment wherein within the enclosure the secondary battery further comprises a solid electrolyte selected from the group consisting of lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$) and lithium aluminum titanium phosphate ($Li_{1.4}Al_{0.4}Ti_{1.6}(PO_4)_3$).

Embodiment 70. The secondary battery set forth in any prior embodiment wherein one of the electrode active material and the counter-electrode material is a cathodically active material selected from the group consisting of intercalation chemistry positive electrodes and conversion chemistry positive electrodes.

Embodiment 71. The secondary battery set forth in any prior embodiment wherein one of the electrode active material and the counter-electrode material is a cathodically active material comprising an intercalation chemistry positive electrode material.

Embodiment 72. The secondary battery set forth in any prior embodiment wherein one of the electrode active material and the counter-electrode material is a cathodically active material comprising a conversion chemistry positive electrode active material.

Embodiment 73. The secondary battery set forth in any prior embodiment wherein one of the electrode active material and the counter-electrode material is a cathodically active material selected from the group consisting of S (or $Li_2S$ in the lithiated state), LiF, Fe, Cu, Ni, $FeF_2$, $FeO_dF_{3-2}d$, $FeF_3$, $CoF_3$, $CoF_2$, $CuF_2$, $NiF_2$, where $0 \leq d \leq 0.5$.

Embodiment 74. A method of manufacturing a battery assembly for use with a secondary battery, where the battery assembly has mutually perpendicular transverse, longitudinal, and vertical axes corresponding to x, y and z axes, respectively, of a three-dimensional Cartesian coordinate system, the method comprising: preparing a unit cell by stacking an electrode current collector layer, an electrode layer, a separator layer, a counter-electrode layer, and a counter-electrode current collector layer in succession in the longitudinal direction, the electrode layer comprises an electrode active material, and the counter-electrode layer comprises a counter-electrode active material, wherein one of the electrode active material and the counter-electrode material is a cathodically active material and the other of the electrode active material and the counter-electrode material is an anodically active material, and placing a population of extended spacer members in the stacked succession between the electrode current collector layer and the counter-electrode current collector layer, one of the extended spacer members being spaced in the y-axis direction from the other spacer member, the x-axis extent of the extended spacer members being a distance SD greater than the x-axis extent of the unit cell.

Embodiment 75. The method set forth in Embodiment 74 wherein the distance SD is up to 4 mm.

Embodiment 76. The method according to any prior embodiment, further comprising placing the unit cell within a constraint such that the extended spacer members extend the distance SD from an edge of the constraint.

Embodiment 77. The method set forth in any prior embodiment, further comprising sealing the unit cell within a sealed enclosure.

Embodiment 78. The method set forth in any prior embodiment further comprising enlarging a radius of curvature of an inner surface of the enclosure around the x-axis edge of the constraint by up to 3 mm.

Embodiment 79. The method set forth in any prior embodiment wherein the extended spacer members have a length extending in the x-axis direction, the length of the spacer members being equal to or less than 3000 μm.

Embodiment 80. The method set forth in any prior embodiment further comprising placing the extended spacer members between the separator layer and the electrode layer.

Embodiment 81. The method set forth in any prior embodiment further comprising placing the extended spacer members between the separator layer and the electrode current collector layer.

Embodiment 82. The method set forth in any prior embodiment further comprising placing the extended spacer members between the separator and the counter-electrode layer.

Embodiment 83. The method set forth in any prior embodiment further comprising placing the extended spacer members between the separator layer and the counter-electrode current collector layer.

Embodiment 84. The method set forth in any prior embodiment further comprising adhering the extended spacer members to at least one of the electrode current collector layer, the electrode layer, the separator layer, the counter-electrode layer, and the counter-electrode current collector layer.

Embodiment 85. The method set forth in any prior embodiment wherein the extended spacer members are adhered to the electrode current collector layer.

Embodiment 86. The method set forth in any prior embodiment wherein the extended spacer members are adhered to the electrode layer.

Embodiment 87. The method set forth in any prior embodiment wherein the extended spacer members are adhered to the separator layer.

Embodiment 88. The method set forth in any prior embodiment wherein the extended spacer members are adhered to the counter-electrode current collector layer.

Embodiment 89. An electrode assembly for a secondary battery, the electrode assembly having mutually perpendicular transverse, longitudinal, and vertical axes corresponding to x, y and z axes, respectively, of a three-dimensional Cartesian coordinate system, the electrode assembly comprising: a unit cell comprising an electrode current collector layer, an electrode layer, a separator layer, a counter-electrode layer, and a counter-electrode current collector layer in succession in the longitudinal direction, the electrode layer comprises an electrode active material, and the counter-electrode layer comprises a counter-electrode active material, wherein one of the electrode active material and the counter-electrode material is a cathodically active material and the other of the electrode active material and the counter-electrode material is an anodically active material, and a population of extended spacer members between the electrode current collector layer and the counter-electrode current collector layer, one of the extended spacer members being spaced in the y-axis direction from the other spacer member, the x-axis extent of the extended spacer members being a distance SD greater than the x-axis extent of the unit cell.

Embodiment 90. The electrode assembly set forth in embodiment 89 wherein the distance SD is up to 4 mm.

Embodiment 91. The electrode assembly according to any prior embodiment, wherein the unit cell is disposed within a constraint such that the extended spacer members extend the distance SD from an edge of the constraint.

Embodiment 92. A method of manufacturing an electrode assembly for a secondary battery, the electrode assembly having mutually perpendicular transverse, longitudinal, and vertical axes corresponding to x, y and z axes, respectively, of a three-dimensional Cartesian coordinate system, the method comprising: preparing a unit cell by stacking an electrode current collector layer, an electrode layer, a separator layer, a counter-electrode layer, and a counter-electrode current collector layer in succession in the longitudinal direction, the electrode layer comprises an electrode active material, and the counter-electrode layer comprises a counter-electrode active material, wherein one of the electrode active material and the counter-electrode material is a cathodically active material and the other of the electrode active material and the counter-electrode material is an anodically active material, and placing a population of extended spacer members between the electrode current collector layer and the counter-electrode current collector layer, one of the extended spacer members being spaced in the y-axis direction from the other spacer member; placing the unit cell within a constraint, such that, the x-axis extent of the extended spacer members being a distance SD greater than the x-axis extent of the constraint.

Embodiment 93. The method set forth in embodiment 92, wherein the distance SD is up to 4 mm.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A secondary battery for cycling between a charged state and a discharged state, the battery comprising a constraint and an electrode assembly disposed within the constraint, wherein
the electrode assembly has mutually perpendicular transverse, longitudinal, and vertical axes corresponding to x, y and z axes, respectively, of a three-dimensional Cartesian coordinate system,
the electrode assembly comprises a population of unit cells comprising an electrode current collector layer, an electrode layer, a separator layer, a counter-electrode layer, and a counter-electrode current collector layer in stacked succession in the longitudinal direction,
the electrode layer comprises an electrode active material, and the counter-electrode layer comprises a counter-electrode active material, wherein one of the electrode active material and the counter-electrode active material is a cathodically active material and the other of the electrode active material and the counter-electrode active material is an anodically active material,
a subset of the unit cell population further comprising a pair of extended spacer members located in the stacked succession between the electrode current collector layer and the counter-electrode current collector layer, one of the extended spacer members being spaced in the y-axis direction from the other extended spacer member, at least a portion of the counter-electrode active material of the counter-electrode layer being located between the extended spacer members such that the portion of the counter-electrode active material and the extended spacer members lie in a common plane defined by the x and z axes, wherein each of the extended spacer members extend a distance SD in the x-axis direction beyond an x-axis edge of the constraint.

2. The secondary battery set forth in claim 1 wherein the distance SD is up to 4 mm.

3. The secondary battery set forth in claim 1 wherein the extended spacer members have a length extending in the x-axis direction, the length of the extended spacer members being equal to or less than 3000 μm.

4. The secondary battery set forth in claim 1 wherein the extended spacer members are disposed between the separator layer and the electrode layer.

5. The secondary battery set forth in claim 1 wherein the extended spacer members are disposed between the separator layer and the electrode current collector layer.

6. The secondary battery set forth in claim 1 wherein the extended spacer members are disposed between the separator layer and the counter-electrode layer.

7. The secondary battery set forth in claim 1 wherein the extended spacer members are disposed between the separator layer and the counter-electrode current collector layer.

8. The secondary battery set forth in claim 1 wherein the extended spacer members are adhered to at least one of the electrode current collector layer, the electrode layer, the separator layer, the counter-electrode layer, and the counter-electrode current collector layer.

9. The secondary battery set forth in claim 8 wherein the extended spacer members are adhered to the electrode current collector layer.

10. The secondary battery set forth in claim 8 wherein the extended spacer members are adhered to the electrode layer.

11. The secondary battery set forth in claim 8 wherein the extended spacer members are adhered to the separator layer.

12. The secondary battery set forth in claim 8 wherein the extended spacer members are adhered to the counter-electrode current collector layer.

13. The secondary battery set forth in claim 1 wherein the extended spacer members comprise an electrically insulating material.

14. The secondary battery set forth in claim 1 wherein the extended spacer members comprise graphite or graphene.

15. The secondary battery set forth in claim 1 wherein the extended spacer members comprise a polymeric material.

16. The secondary battery set forth in claim 1 wherein the extended spacer members comprise a homopolymer, copolymer or polymer blend.

17. The secondary battery set forth in claim 1 wherein the extended spacer members comprise a fluoropolymer derived from monomers containing vinylidene fluoride, hexafluoropropylene, tetrafluoropropene, a polyolefin such as polyethylene, polypropylene, or polybutene, ethylene-diene-propene terpolymer, polystyrene, polymethyl methacrylate, polyethylene glycol, polyvinyl acetate, polyvinyl butyral, polyacetal, and polyethyleneglycol diacrylate, methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile, polyethylene oxide, acrylates, styrenes, epoxies, silicones, polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymetyl cellulose, acrylonitrile-styrene-butadiene copolymer, polyimide, polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations or a copolymer thereof.

18. The secondary battery set forth in claim 1 wherein the extended spacer members comprise a fluoropolymer.

19. The secondary battery set forth in claim 1 wherein the extended spacer members comprise a polyolefin.

20. The secondary battery set forth in claim 1 wherein the extended spacer members comprise a polyolefin selected from the group consisting of homopolymers, copolymers and polymer blends of polyethylene, polypropylene, and polybutene.

21. The secondary battery set forth in claim 1 wherein the extended spacer members comprise polyethylene or polypropylene.

22. The secondary battery set forth in claim 1, wherein the extended spacer members have a total length greater than a total length of the electrode layer measured in the x-axis direction.

23. A method of manufacturing a battery assembly for use with a secondary battery, the battery assembly having mutually perpendicular transverse, longitudinal, and vertical axes corresponding to x, y and z axes, respectively, of a three-dimensional Cartesian coordinate system, the method comprising:
preparing a unit cell by stacking an electrode current collector layer, an electrode layer, a separator layer, a counter-electrode layer, and a counter-electrode current collector layer in succession in the longitudinal direction, the electrode layer comprises an electrode active material, and the counter-electrode layer comprises a counter-electrode active material, wherein one of the electrode active material and the counter-electrode active material is a cathodically active material and the other of the electrode active material and the counter-electrode active material is an anodically active material, and
placing a population of extended spacer members in the stacked succession between the electrode current collector layer and the counter-electrode current collector layer, one of the extended spacer members being spaced in the y-axis direction from the other extended spacer member, the x-axis extent of the extended spacer members being a distance SD greater than the x-axis extent of the unit cell.

24. The method set forth in claim 23 wherein the distance SD is up to 4 mm.

25. The method according to claim 23, further comprising placing the unit cell within a constraint such that the extended spacer members extend the distance SD from an edge of the constraint.

26. An electrode assembly for a secondary battery, the electrode assembly having mutually perpendicular transverse, longitudinal, and vertical axes corresponding to x, y and z axes, respectively, of a three-dimensional Cartesian coordinate system, the electrode assembly comprising:
a unit cell comprising an electrode current collector layer, an electrode layer, a separator layer, a counter-electrode layer, and a counter-electrode current collector layer in succession in the longitudinal direction, the electrode layer comprises an electrode active material, and the counter-electrode layer comprises a counter-electrode active material, wherein one of the electrode active material and the counter-electrode active material is a cathodically active material and the other of the electrode active material and the counter-electrode active material is an anodically active material, and
a population of extended spacer members between the electrode current collector layer and the counter-electrode current collector layer, one of the extended spacer members being spaced in the y-axis direction from the other extended spacer member, the x-axis extent of the extended spacer members being a distance SD greater than the x-axis extent of the unit cell.

27. The electrode assembly set forth in claim 26 wherein the distance SD is up to 4 mm.

28. The electrode assembly set forth in claim 26, wherein the unit cell is disposed within a constraint such that the extended spacer members extend the distance SD from an edge of the constraint.

29. A method of manufacturing an electrode assembly for a secondary battery, the electrode assembly having mutually perpendicular transverse, longitudinal, and vertical axes corresponding to x, y and z axes, respectively, of a three-dimensional Cartesian coordinate system, the method comprising:

preparing a unit cell by stacking an electrode current collector layer, an electrode layer, a separator layer, a counter-electrode layer, and a counter-electrode current collector layer in succession in the longitudinal direction, the electrode layer comprises an electrode active material, and the counter-electrode layer comprises a counter-electrode active material, wherein one of the electrode active material and the counter-electrode active material is a cathodically active material and the other of the electrode active material and the counter-electrode active material is an anodically active material, and placing a population of extended spacer members between the electrode current collector layer and the counter-electrode current collector layer, one of the extended spacer members being spaced in the y-axis direction from the other extended spacer member; and placing the unit cell within a constraint, such that, the x-axis extent of the extended spacer members is a distance SD greater than the x-axis extent of the constraint.

30. The method according to claim 29, wherein the distance SD is up to 4 mm.

* * * * *